US012685616B2

(12) United States Patent
Stampfl et al.

(10) Patent No.: US 12,685,616 B2
(45) Date of Patent: Jul. 21, 2026

(54) METHODS FOR ADDITIVELY MANUFACTURING MEDICAL DEVICES USING BIOGLASS FIBER REINFORCED POLYMERS

(71) Applicant: Align Technology, Inc., San Jose, CA (US)

(72) Inventors: Jürgen Stampfl, Vienna (AT); Yan Chen, Cupertino, CA (US); Chunhua Li, Cupertino, CA (US); Peter Dorfinger, Los Altos Hills, CA (US); Alexander Hochwallner, Vienna (AT)

(73) Assignee: Align Technology, Inc., San Jose, CA (US)

(*) Notice: Subject to any disclaimer, the term of this patent is extended or adjusted under 35 U.S.C. 154(b) by 258 days.

(21) Appl. No.: 18/348,133

(22) Filed: Jul. 6, 2023

(65) Prior Publication Data

US 2024/0016578 A1 Jan. 18, 2024

Related U.S. Application Data

(60) Provisional application No. 63/358,714, filed on Jul. 6, 2022.

(51) Int. Cl.
*A61C 7/08* (2006.01)
*A61C 7/10* (2006.01)
(Continued)

(52) U.S. Cl.
CPC .................. *A61C 7/08* (2013.01); *A61C 7/10* (2013.01); *B33Y 70/10* (2020.01); *B33Y 80/00* (2014.12);
(Continued)

(58) Field of Classification Search
CPC ....... A61C 7/08; A61C 7/10; A61C 2201/007; B33Y 80/00; B33Y 70/10; C08J 3/28;
(Continued)

(56) References Cited

U.S. PATENT DOCUMENTS 5,820,368 A 10/1998 Wolk
5,975,893 A 11/1999 Chishti et al.
(Continued)

FOREIGN PATENT DOCUMENTS

CN 117815455 A * 4/2024 ............. B33Y 80/00
KR 20210125660 A 10/2021
(Continued)

OTHER PUBLICATIONS

Syed, Ceramics International, vol. 46, Issue 13, Sep. 2020, pp. 21623-21631 (Year: 2020).*
(Continued)

*Primary Examiner* — JaMel M Nelson
*Assistant Examiner* — Erica Hartsell Funk
(74) *Attorney, Agent, or Firm* — Seed Intellectual Property Law Group LLP

(57) ABSTRACT

Disclosed herein are methods for manufacturing medical devices, such as implants, joint replacements, graft materials, augmentation materials, prosthetic materials, etc., from solid material reinforced curable resins. Methods of repositioning a patient's teeth using such medical devices are also provided.

20 Claims, 10 Drawing Sheets

(51) Int. Cl.
*B33Y 70/10* (2020.01)
*B33Y 80/00* (2015.01)
*C08J 3/28* (2006.01)
*C08K 3/40* (2006.01)
*C08K 7/10* (2006.01)
*C08K 7/14* (2006.01)
*C08L 33/10* (2006.01)

(52) U.S. Cl.
CPC .................. *C08J 3/28* (2013.01); *C08K 3/40* (2013.01); *C08K 7/10* (2013.01); *C08K 7/14* (2013.01); *C08L 33/10* (2013.01); *A61C 2201/007* (2013.01); *C08K 2201/003* (2013.01)

(58) Field of Classification Search
CPC ... C08K 3/40; C08K 7/10; C08K 7/14; C08K 2201/003; C08L 33/10
See application file for complete search history.

(56) References Cited

U.S. PATENT DOCUMENTS 6,183,248 B1 2/2001 Chishti et al.
6,309,215 B1 10/2001 Phan et al.
6,386,864 B1 5/2002 Kuo
6,450,807 B1 9/2002 Chishti et al.
6,454,565 B2 9/2002 Phan et al.
6,471,511 B1 10/2002 Chishti et al.
6,524,101 B1 2/2003 Phan et al.
6,572,372 B1 6/2003 Phan et al.
6,607,382 B1 8/2003 Kuo et al.
6,705,863 B2 3/2004 Phan et al.
6,749,414 B1 6/2004 Hanson et al.
6,783,604 B2 8/2004 Tricca
6,790,035 B2 9/2004 Tricca et al.
6,814,574 B2 11/2004 Abolfathi et al.
6,830,450 B2 12/2004 Knopp et al.
6,947,038 B1 9/2005 Anh et al.
7,074,039 B2 7/2006 Kopelman et al.
7,104,792 B2 9/2006 Taub et al.
7,121,825 B2 10/2006 Chishti et al.
7,160,107 B2 1/2007 Kopelman et al.
7,192,273 B2 3/2007 McSurdy, Jr.
7,347,688 B2 3/2008 Kopelman et al.
7,354,270 B2 4/2008 Abolfathi et al.
7,448,514 B2 11/2008 Wen
7,481,121 B1 1/2009 Cao
7,543,511 B2 6/2009 Kimura et al.
7,553,157 B2 6/2009 Abolfathi et al.
7,600,999 B2 10/2009 Knopp
7,658,610 B2 2/2010 Knopp
7,766,658 B2 8/2010 Tricca et al.
7,771,195 B2 8/2010 Knopp et al.
7,854,609 B2 12/2010 Chen et al.
7,871,269 B2 1/2011 Wu et al.
7,878,801 B2 2/2011 Abolfathi et al.
7,878,805 B2 2/2011 Moss et al.
7,883,334 B2 2/2011 Li et al.
7,892,474 B2 2/2011 Shkolnik et al.
7,914,283 B2 3/2011 Kuo
7,947,508 B2 5/2011 Tricca et al.
8,152,518 B2 4/2012 Kuo
8,172,569 B2 5/2012 Matty et al.
8,235,715 B2 8/2012 Kuo
8,292,617 B2 10/2012 Brandt et al.
8,337,199 B2 12/2012 Wen
8,401,686 B2 3/2013 Moss et al.
8,517,726 B2 8/2013 Kakavand et al.
8,562,337 B2 10/2013 Kuo et al.
8,641,414 B2 2/2014 Borovinskih et al.
8,684,729 B2 4/2014 Wen
8,708,697 B2 4/2014 Li et al.
8,758,009 B2 6/2014 Chen et al.
8,771,149 B2 7/2014 Rahman et al.
8,899,976 B2 12/2014 Chen et al.
8,899,977 B2 12/2014 Cao et al.
8,936,463 B2 1/2015 Mason et al.
8,936,464 B2 1/2015 Kopelman
9,022,781 B2 5/2015 Kuo et al.
9,119,691 B2 9/2015 Namiranian et al.
9,161,823 B2 10/2015 Morton et al.
9,241,774 B2 1/2016 Li et al.
9,326,831 B2 5/2016 Cheang
9,433,476 B2 9/2016 Khardekar et al.
9,610,141 B2 4/2017 Kopelman et al.
9,655,691 B2 5/2017 Li et al.
9,675,427 B2 6/2017 Kopelman
9,700,385 B2 7/2017 Webber
9,744,001 B2 8/2017 Choi et al.
9,844,424 B2 12/2017 Wu et al.
10,045,835 B2 8/2018 Boronkay et al.
10,111,730 B2 10/2018 Webber et al.
10,150,244 B2 12/2018 Sato et al.
10,201,409 B2 2/2019 Mason et al.
10,213,277 B2 2/2019 Webber et al.
10,299,894 B2 5/2019 Tanugula et al.
10,363,116 B2 7/2019 Boronkay
10,383,705 B2 8/2019 Shanjani et al.
D865,180 S 10/2019 Bauer et al.
10,449,016 B2 10/2019 Kimura et al.
10,463,452 B2 11/2019 Matov et al.
10,470,847 B2 11/2019 Shanjani et al.
10,492,888 B2 12/2019 Chen et al.
10,517,701 B2 12/2019 Boronkay
10,537,406 B2 1/2020 Wu et al.
10,537,463 B2 1/2020 Kopelman
10,548,700 B2 2/2020 Fernie
10,555,792 B2 2/2020 Kopelman et al.
10,588,776 B2 3/2020 Cam et al.
10,613,515 B2 4/2020 Cramer et al.
10,639,134 B2 5/2020 Shanjani et al.
10,743,964 B2 8/2020 Wu et al.
10,758,323 B2 9/2020 Kopelman
10,781,274 B2 9/2020 Liska et al.
10,813,720 B2 10/2020 Grove et al.
10,874,483 B2 12/2020 Boronkay
10,881,487 B2 1/2021 Cam et al.
10,912,629 B2 2/2021 Tanugula et al.
10,959,810 B2 3/2021 Li et al.
10,993,783 B2 5/2021 Wu et al.
11,026,768 B2 6/2021 Moss et al.
11,026,831 B2 6/2021 Kuo
11,045,282 B2 6/2021 Kopelman et al.
11,045,283 B2 6/2021 Riley et al.
11,103,330 B2 8/2021 Webber et al.
11,123,156 B2 9/2021 Cam et al.
11,154,382 B2 10/2021 Kopelman et al.
11,166,788 B2 11/2021 Webber
11,174,338 B2 11/2021 Liska et al.
11,219,506 B2 1/2022 Shanjani et al.
11,259,896 B2 3/2022 Matov et al.
11,273,011 B2 3/2022 Shanjani et al.
11,278,375 B2 3/2022 Wang et al.
11,318,667 B2 5/2022 Mojdeh et al.
11,331,166 B2 5/2022 Morton et al.
11,344,385 B2 5/2022 Morton et al.
11,376,101 B2 7/2022 Sato et al.
11,419,702 B2 8/2022 Sato et al.
11,419,710 B2 8/2022 Mason et al.
11,471,253 B2 10/2022 Venkatasanthanam et al.
11,497,586 B2 11/2022 Kopelman
11,504,214 B2 11/2022 Wu et al.
11,523,881 B2 12/2022 Wang et al.
11,534,268 B2 12/2022 Li et al.
11,534,974 B2 12/2022 O'Leary et al.
11,554,000 B2 1/2023 Webber
11,564,777 B2 1/2023 Kopelman et al.
11,571,278 B2 2/2023 Kopelman et al.
11,571,279 B2 2/2023 Wang et al.
11,576,750 B2 2/2023 Kopelman et al.
11,576,752 B2 2/2023 Morton et al.
11,589,955 B2 2/2023 Medvinskaya et al.
11,596,502 B2 3/2023 Webber et al.
11,602,414 B2 3/2023 Sato et al.

(56) References Cited

U.S. PATENT DOCUMENTS

| | | | |
|---|---|---|---|
| 11,642,194 | B2 | 5/2023 | Allen et al. |
| 11,642,198 | B2 | 5/2023 | Avi et al. |
| 11,666,415 | B2 | 6/2023 | Wang et al. |
| 11,701,203 | B2 | 7/2023 | Svetlana et al. |
| 11,737,857 | B2 | 8/2023 | Mitra et al. |
| 2002/0192617 | A1 | 12/2002 | Phan et al. |
| 2004/0166462 | A1 | 8/2004 | Phan et al. |
| 2004/0166463 | A1 | 8/2004 | Wen et al. |
| 2005/0014105 | A1 | 1/2005 | Abolfathi et al. |
| 2005/0186524 | A1 | 8/2005 | Abolfathi et al. |
| 2005/0244768 | A1 | 11/2005 | Taub et al. |
| 2006/0019218 | A1 | 1/2006 | Kuo |
| 2006/0078841 | A1 | 4/2006 | DeSimone et al. |
| 2006/0115782 | A1 | 6/2006 | Li et al. |
| 2006/0115785 | A1 | 6/2006 | Li et al. |
| 2006/0199142 | A1 | 9/2006 | Liu et al. |
| 2006/0234179 | A1 | 10/2006 | Wen et al. |
| 2008/0118882 | A1 | 5/2008 | Su |
| 2008/0160473 | A1 | 7/2008 | Li et al. |
| 2008/0286716 | A1 | 11/2008 | Sherwood |
| 2008/0286717 | A1 | 11/2008 | Sherwood |
| 2009/0280450 | A1 | 11/2009 | Kuo |
| 2010/0055635 | A1 | 3/2010 | Kakavand |
| 2010/0129763 | A1 | 5/2010 | Kuo |
| 2011/0269092 | A1 | 11/2011 | Kuo et al. |
| 2014/0061974 | A1 | 3/2014 | Tyler |
| 2014/0067334 | A1 | 3/2014 | Kuo |
| 2014/0265034 | A1 | 9/2014 | Dudley |
| 2015/0102532 | A1 | 4/2015 | DeSimone et al. |
| 2016/0083631 | A1* | 3/2016 | Jia .......................... C09J 133/10 525/303 |
| 2016/0193014 | A1 | 7/2016 | Morton et al. |
| 2017/0007359 | A1 | 1/2017 | Kopelman et al. |
| 2017/0135793 | A1 | 5/2017 | Webber et al. |
| 2018/0360567 | A1 | 12/2018 | Xue et al. |
| 2019/0000592 | A1 | 1/2019 | Cam et al. |
| 2019/0000593 | A1 | 1/2019 | Cam et al. |
| 2019/0046297 | A1 | 2/2019 | Kopelman et al. |
| 2019/0099129 | A1 | 4/2019 | Kopelman et al. |
| 2019/0262101 | A1 | 8/2019 | Shanjani et al. |
| 2019/0298494 | A1 | 10/2019 | Webber et al. |
| 2020/0155276 | A1 | 5/2020 | Cam et al. |
| 2020/0188062 | A1 | 6/2020 | Kopelman et al. |
| 2020/0214598 | A1 | 7/2020 | Li et al. |
| 2021/0147672 | A1 | 5/2021 | Cole et al. |

FOREIGN PATENT DOCUMENTS

| | | | |
|---|---|---|---|
| WO | WO-2008149221 | A1 | 12/2008 |
| WO | WO-2017207967 | A1 | 12/2017 |
| WO | WO-2021046615 | A1 | 3/2021 |

OTHER PUBLICATIONS

Kawanabe, et al., "A New Bioactive Bone Cement Consisting of BIS-GMA Resin and Bioactive Glass Powder," Journal of Applied Biomaterials : an Official Journal of the Society for Biomaterials, 1993, vol. 4 (2), pp. 135-141.

* cited by examiner

METHODS FOR ADDITIVELY MANUFACTURING MEDICAL DEVICES USING BIOGLASS FIBER REINFORCED POLYMERS

INCORPORATION BY REFERENCE

All publications, patents, and patent applications mentioned in the present disclosure are hereby incorporated by reference to the same extent as if each individual publication, patent, or patent application was specifically and individually indicated to be incorporated by reference in its entirety. This application claims priority to U.S. Provisional Patent Application No. 63/358,714, filed Jul. 6, 2022, entitled "BIOGLASS FIBER REINFORCEMENT OF ADDITIVELY MANUFACTURED POLYMERS," the contents of which are hereby incorporated by reference as if set forth fully herein.

FIELD

The present disclosure relates to a polymer, and more particularly, to a bioglass fiber reinforcement of additively manufactured polymers. Although the present disclosure is suitable for a wide scope of applications, it is particularly suitable for providing stereolithography-based printing methods capable of utilizing solid reinforcements.

BACKGROUND

Solid materials such as bioglass fibers are often added to composite materials to enhance mechanical properties such as strength, stiffness, and creep resistance. While a wide range of solid materials are utilized in injection molding manufacturing, such reinforcements are not currently compatible with most stereolithography-based biomedical device printing methods, as such methods tend to yield materials in which the solid reinforcements outwardly extrude, which can diminish biocompatibility and performance. Nonetheless, as many biomedical devices require the spatial resolution and textural control offered by stereolithography-based printing methods, there is a need for stereolithography-based printing methods capable of utilizing solid reinforcements.

SUMMARY

Accordingly, the present disclosure is directed to a bioglass fiber reinforcement of additively manufactured polymers that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a material includes a cured resin having a first solubility; and a reinforcement material dispersed throughout the cured resin and having a second solubility, wherein the second solubility is at least $10^2$ times greater than the first solubility in water at 25° C. and a pH of 7.

The first solubility is $10^{-2}$ g/L in water at 25° C. and a pH 7, and the second solubility is in a range of 5 mg/L and 5000 mg/L in water at 25° C. and a pH of 7.

The reinforcement material has a diameter of about 5 to about 500 microns (μm), a length of about 1 to about 100 mm, or a combination thereof.

The reinforcement material has a diameter to length ratio of between about 100000:1 and about 100:1.

The reinforcement material comprises at least one of CaO and $SiO_2$.

The reinforcement material is bioactive.

The reinforcement material increases a stiffness of the material by at least 25% to at least 100% relative to a stiffness of a medical device comprising only the cured resin.

The material comprises (i) a flexural strength from about 50 to about 600 MPa, (ii) an elastic modulus from about 5 to about 30 GPa, and (iii) maximum strain of between about 2.5 and about 30%, or (iv) any combination of (i)-(iii).

The material comprises from about 30 to about 75 wt % of the reinforcement material.

The cured resin is cured from a curable resin having a reactive group comprising one of acrylate, methacrylate, vinyl ester, vinyl carbonate, or a combination thereof.

The cured resin comprises urethane dimethacrylate, bisphenol A-glycidyl methacrylate (bis-GMA), dodecandediol dimethacrylate, or a combination thereof.

The reinforcement material may be bioglass or bioglass fiber.

In another aspect of the present disclosure, a material comprises a cured resin having a first solubility; and a bioglass dispersed throughout the cured resin and having a second solubility, wherein the first solubility is $10^{-2}$ g/L in water at 25° C. and a pH 7, and the second solubility is in a range of 5 mg/L and 5000 mg/L in water at 25° C. and a pH of 7.

The bioglass has a diameter of about 5 to about 500 microns (μm), a length of about 1 to about 100 mm, or a combination thereof.

The bioglass has a diameter to length ratio of between about 100000:1 and about 100:1.

The bioglass comprises at least one of CaO and SiO2.

The bioglass increases a stiffness of the material by at least 25% to 100% relative to a stiffness of the material comprising only the cured resin.

The material comprises (i) a flexural strength from about 50 to about 600 MPa; (ii) an elastic modulus from about 3 to about 30 GPa; and (iii) maximum strain of between about 2.5 and about 30%, or (iv) any combination of (i)-(iii).

The material comprises from about 30 to about 75 wt % of the bioglass.

In another aspect of the present disclosure, a material for use in a medical device comprises a cured resin having a first solubility; and a reinforcement material dispersed throughout the cured resin and having a second solubility, wherein the second solubility is at least $10^2$ times greater than the first solubility in water at 25° C. and a pH of 7.

The reinforcement material has a diameter of about 5 to about 500 microns (μm), a length of about 1 to about 100 mm, or a combination thereof.

The reinforcement material has a diameter to length ratio of between about 100000:1 and about 100:1.

The reinforcement material comprises at least one of CaO and $SiO_2$.

The reinforcement material is at least one of bioglass and bioglass fiber.

The medical device comprises an implant, a joint replacement, a graft material, an augmentation material, prosthetic material or a combination thereof.

The medical device is configured for use as an orthodontic appliance.

The reinforcement material increases a stiffness of the orthodontic appliance by at least 25% to at least 100% relative to a stiffness of an orthodontic appliance comprising only the cured resin.

The orthodontic appliance comprises an aligner shaped to receive and resiliently reposition a person's dentiton from a first arrangement toward a second arrangement.

The orthodontic appliance comprises an aligner shaped to receive and resiliently reposition a person's dentiton from a first arrangement toward a second arrangement, and wherein the aligner is one of a series of aligners configured to reposition the person's dentition from an initial arrangement toward a target arrangement.

The orthodontic appliance comprises a palatal expander shaped to engage with and exert expansion forces on a person's palate.

The orthodontic appliance comprises a palatal expander shaped to engage with and exert expansion forces on a person's palate, and the palatal expander is one of a series of incremental palatal expanders configured to expand the person's palate from an initial arrangement toward a target arrangement.

The material comprises (i) a flexural strength from about 50 to about 600 MPa; (ii) an elastic modulus from about 5 to about 30 GPa; and (iii) maximum strain of between about 2.5 and about 7.5%, or (iv) any combination of (i)-(iii).

The material comprises from about 30 to about 60 wt % of the reinforcement material.

The cured resin is cured from a curable resin having a reactive group comprising one of acrylate, methacrylate, vinyl ester, vinyl carbonate, or a combination thereof.

The cured resin comprises one of urethane dimethacrylate, bisphenol A-glycidyl methacrylate (bis-GMA), dodecandediol dimethacrylate, or a combination thereof.

In another aspect of the present disclosure, a method of treating a subject in need thereof comprises applying orthodontic appliance of the above described to a patient, thereby treating the subject.

In another aspect of the present disclosure, a method of repositioning a patient's teeth comprises generating a treatment plan for the patient, the plan comprising a plurality of intermediate tooth arrangements for moving teeth along a treatment path from an initial tooth arrangement toward a final tooth arrangement; producing an orthodontic appliance manufactured with the material described above; and moving, with the orthodontic appliance, at least one of the patient's teeth toward an intermediate tooth arrangement or the final tooth arrangement.

In above described method, the producing the dental appliance comprises three-dimensionally (3D) printing of the dental appliance.

The method further comprises tracking progression of the patient's teeth along the treatment path after administration of the dental appliance to the patient, wherein the tracking progression comprises comparing a current arrangement of the patient's teeth to a planned arrangement of the patient's teeth.

In above described method, greater than 60% of the patient's teeth are on track with the treatment plan after 2 weeks of treatment.

In above described method, the orthodontic appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth.

In another aspect of the present disclosure, a method of manufacturing a finished product for a medical device comprises providing a curable resin comprising a solid material dispersed therethrough; curing a portion of the curable resin, thereby forming a cured resin; separating an uncured portion or the curable resin from the cured resin, thereby producing a medical device.

In a further aspect of the present disclosure, a method of manufacturing a surface modified device, the method comprises providing a curable resin comprising a solid material dispersed therethrough; curing a portion of the curable resin, thereby forming a cured resin with a first portion of the solid material embedded within the cured resin and a second portion of the solid material exposed from a surface of the cured resin; separating an uncured portion or the curable resin from the cured resin; and removing at least a portion of the second portion of the solid material, thereby forming the surface modified device.

In the manufacturing method described above, the solid material comprises a bioglass fiber.

In the manufacturing method described above, the curing comprises photopolymerization.

In the manufacturing method described above, the separating comprises removing the cured resin from a vat comprising the curable resin.

In the manufacturing method described above, the removing comprises dissolving the at least a portion of the second portion of the solid material.

In the manufacturing method described above, the dissolving comprises use of an organic solvent and salt water.

In the manufacturing method described above, the first portion of the solid material is retained within the cured resin during the removing at least a portion of the second portion of the solid material.

In the manufacturing method described above, during the removing at least 80% of the second portion of the solid material is removed in less than 5 minutes.

In the manufacturing method described above, the curable resin comprises an acrylate or a methacrylate.

In the manufacturing method described above, the solid material comprises bioactivity.

In the manufacturing method described above, during the curing the curable resin shrinks at least 5% less than for the curable resin lacking the solid material.

In the manufacturing method described above, the solid material is homogeneously or randomly dispersed throughout the curable resin.

DETAILED DESCRIPTION

Figure 1A:
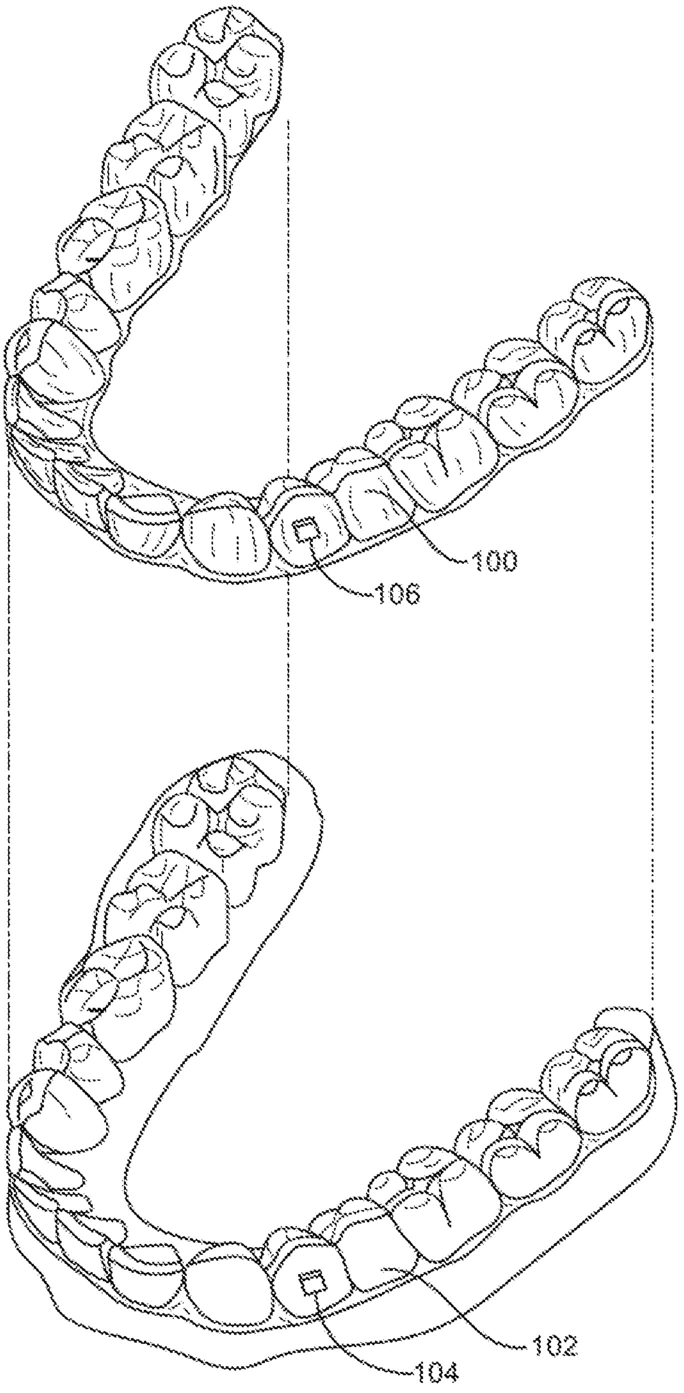
FIG. 1A illustrates a tooth repositioning appliance, in accordance with aspects of the present disclosure.

Among the aspects disclosed herein are solid material reinforced curable resins, polymeric materials generated therefrom, and methods for generating the resins and polymeric materials. While there has been a longstanding need for solid material-reinforced, printed materials, such materials are often hampered by extrusion of these solid materials (e.g., surface exposed or extending outward from surfaces of finished materials) in the final printed devices, which can render them unsuitable for a range of commercial, industrial, and biomedical applications. For biomedical devices (such as dental aligners), sharp edges along surface exposed materials (e.g., extruding solid fibers or particles) can damage tissues and render devices uncomfortable during use. Furthermore, exposed solid materials can prevent coupling between device components, such as discrete dental aligner layers. Unable to exploit solid materials for toughness enhancement, many printed devices instead use greater amounts of resin, thereby increasing device costs and bulk and in some cases decreasing their applicability or performance.

Responsive to the need for solid material reinforced materials, aspects of the present disclosure provide compositions and methods for generating reinforced printed materials lacking surface exposed solid materials. The methods can comprise printing photopolymerizable, solid material-filled compositions with lithography-based additive manufacturing systems, and selectively removing portions of solid materials extending from surfaces of the resultant printed devices. In some aspects, selective solid material removal is achieved by chemically specific solid material dissolution, wherein the solid material comprises a composition which can be dissolved in a suitable medium in which the cured resin is chemically inert. As only surface exposed solid material will contact such media, the final printed materials can contain buried solid material and lack surface exposed solid material, thereby benefiting from enhanced physical properties conferred by internalized solid materials without suffering from limitations imposed by surface exposed solid material.

In an aspect, the solid material comprises a fiber. Fiber reinforcements can greatly increase strength, storage modulus, and stability while decreasing materials costs. However, conventional printing methods either require fiber patterning prior to extrusion and printing (for example, submerging a fiber weave within a printable resin prior to curing) or, in systems with randomly dispersed fibers, generating devices with extruding fibers. Systems and methods disclosed herein enable printing of enhanced-property fiber-containing materials suitable for a range of dental, medical, commercial, and industrial applications.

I. Solid Material Reinforced Curable Resins

The present disclosure provides solid material reinforced curable resins, as well as solid polymeric materials printed therefrom. A curable resin herein can be a photo-curable resin, a thermo-curable resin, a chemically curable resin, or a combination thereof. As described herein, such polymerizable components can include one or more species of polymerizable compounds of the present disclosure (e.g., 1, 2, 3, or more different species), one or more species of polymerizable monomers (e.g., reactive diluents), one or more solid materials (e.g., a fiber, an insoluble powder, or a particle), one or more photoinitiators, one or more toughness modifiers, as well as combinations thereof.

The curable resin can have a plurality of components, which may be homogeneously or heterogeneously dispersed therethrough. In many cases, a solid material is homogeneously dispersed throughout a curable resin. As curing can fix the solid material in place within a resulting material, surface exposed or extruding solid material can be removed from uncured, partially cured, or cured resin. The curable resin can comprise a single phase or a plurality of phases. The solid material may be evenly or unevenly distributed across multiple phases. In some cases, the solid material is heterogeneously distributed in a first phase and homogeneously distributed in a second phase of the curable resin. In some cases, the solid material comprises different heterogeneous distributions in separated phases of the curable resin. The curable resin can comprise an emulsion. In some such cases, the solid material can be co-localized with or distributed irrespective of emulsion phases.

In some cases, the composition comprises:

20 to 50 wt %, based on the total weight of the composition, of a toughness modifier, wherein the toughness modifier is a polymerizable oligomer having a number average molecular weight of greater than 10 kDa;

5 to 80 wt %, based on the total weight of the composition, of a reactive diluent, wherein the reactive diluent is a polymerizable compound having a molecular weight of 0.1 to 0.5 kDa;

0.1 to 5 wt %, based on the total weight of the composition, of a photoinitiator; and 0.1 to 70 wt % of a solid material;

wherein the viscosity of the composition is 1 to 70 Pa·s at 110° C.

Curable Resin Compositions

1) Solid Materials

The curable resin or a polymeric material generated therefrom can comprise a solid material. As non-limiting examples, the solid material can be provided as a fiber, a powder, a nanoparticle, a microparticle, a powder, a mesh, or a combination thereof. In particular instances, the solid material comprises a fiber. The solid material can comprise a glass, a metal, a metal oxide, a metal sulfide, a ceramic, a salt, silica, a carbon allotrope, or a combination thereof. In certain cases, the solid material comprises a glass. In some cases, the glass comprises at least one, at least two, at least three, or all four of $Na_2O$, CaO, $SiO_2$, and $P_2O_5$. In some cases, solid material comprises a combination of soluble and insoluble materials. For example, the solid material may comprise an insoluble backbone, coupled with a soluble intercalant. In particular cases, the solid material is configured to effuse alkaline (e.g., $Na^+$), alkaline earth ($Mg^{2+}$), or transition metal cations (e.g., $Cu^{2+}$) into solution while retaining a backbone, such as graphene or a low solubility salt. In other cases, the solid material is configured to disintegrate or dissolve completely within a suitable solvent. In particular cases, the solid material is dissolvable, such that a curable or cured resin comprising the solid material can be treated to remove exposed solid material fragments while retaining buried solid material.

The solid material can modify properties of the resin prior to and subsequent to curing. For example, addition of a solid material to the curable resin can increase its viscosity prior to curing and enhance the strength, storage modulus, and stiffness of polymeric materials printed therefrom. For practical applications such as dental appliances, this can lower overall mass and thickness requirements, and enable use of lighter, thinner materials.

The solid material can be heterogeneously distributed throughout the resin. In some cases, the solid material is patterned within the resin. In such cases, the solid material can be disposed in lines, layers, weaves (e.g., overlapping, non-parallel fibers), or pockets. The solid material can be unevenly distributed along a dimension of the resin, such as a concentration gradient along a height or length of the resin. For example, the solid material can be homogeneously distributed along the length and width of a curable resin, but be distributed according to a concentration gradient along the height of the resin. The solid material can be concentrated within an interior space or along a surface of the resin. The solid material can be absent from an interior space or along a surface of the resin.

The solid material can also be homogenously dispersed throughout the resin or a phase of the resin. Such dispersal can comprise random distribution, orientation, or combinations thereof of the solid material within the resin. The solid material can be randomly or evenly distributed throughout the resin. In such cases, portions of the solid material may be exposed along a surface of the resin, and further may extrude out of a surface of the resin. For example, a dispersed, fiber-based solid material may be randomly distributed and oriented throughout the resin, such that portions of the fiber extrude from the resin surface. Upon curing, the solid material may be fixed within portions of the surface exposed or extruding from the resin.

In certain aspects disclosed herein, the solid material can be dissolved in a solution or condition in which the cured resin is insoluble. In such solutions and conditions, insoluble cured resin can block solvent from contacting buried solid material, leading to selective removal of surface exposed solid material from objects printed from the cured material. Solid material solubility can thus be exploited to generate reinforced cured resins lacking surface exposed materials. In some cases, the solid material is soluble and the cured resin is insoluble in aqueous solutions. In some cases, the solid material comprises an aqueous solubility of at least 0.1 g/L at 25° C. at about 7.0. In some cases, the solid material comprises an aqueous solubility of at least 1 g/L at 25° C. at about 7.0. In some cases, the solid material comprises an aqueous solubility of at least 5 g/L at 25° C. at about 7.0. In some cases, the solid material comprises an aqueous solubility of at least 10 g/L at 25° C. at about 7.0. In some cases, the solid material comprises an aqueous solubility of at least 25 g/L at 25° C. at about 7.0. In some cases, the solid material comprises an aqueous solubility of at least 50 g/L at 25° C. at about 7.0. In some cases, the solid material comprises an aqueous solubility of between about 0.1 g/L and about 500 g/L at 25° C. at about 7.0. In some cases, the solubility of the solid material is at least $10^3$, at least $10^4$, at least $10^5$, at least $10^6$, at least $10^7$, at least $10^8$, or at least $10^9$ times greater than the solubility of a cured resin in which it is embedded in water at 25° C. and a pH of about 7.0. For example, in some cases, the cured resin comprises at aqueous solubility of at most $10^{-3}$, at most $10^{-4}$, at most $10^{-5}$, at most $10^{-6}$, at most $10^{-7}$, at most $10^{-8}$, at most $10^{-9}$, or at most $10^{-10}$ g/L in water at 25° C. and a pH of about 7.0.

The aqueous solvent can be alkaline (for example to promote silica dissolution), acidic (for example to promote calcium desorption), or neutral. In some cases, the solid material is soluble in an organic solvent. In some cases, the solid material is soluble in an organic solvent-water mixture. In some cases, the solid material is soluble in a supercritical fluid, such as supercritical $CO_2$. In some cases, addition of acid, base, chelators, salts, reducing agents, or oxidizing agents enhances the solubility of the solid material in a solution without affecting loss of the resin. In particular cases, the solid material is dissolvable in a bodily humor at its site of intended use. For example, a fiber in a printed dental implant may be configured to dissolve in saliva, or a particle in a cartilage implant may be configured to dissolve in synovial fluid. In many cases, the solid material is insoluble within the curable resin.

In particular cases, the solid material comprises a solubility of between about 0.1 g/L and about 500 g/L at 25° C. in a simulated saliva. As used herein, simulated saliva can be an aqueous composition configured to mimic natural salivary fluid, can contain salts such as NaCl, KCl, $MgCl_2$, phosphates, carbonates, and ammonium salts, and can have a pH of about 7.0. In some cases, the solid material comprises a solubility of at least 0.1 g/L at 25° C. in a simulated saliva. In some cases, the solid material comprises a solubility of at least 1 g/L at 25° C. in a simulated saliva. In some cases, the solid material comprises a solubility of at least 10 g/L at 25° C. in a simulated saliva. In some cases, the solid material comprises a solubility of at least 100 g/L at 25° C. in a simulated saliva. In some cases, the solubility of the solid material in simulated saliva is similar to the solubility of the solid material in natural salivary fluid.

In some such cases, the solid material can discharge species which promote biological activity. Such a material can be referred to as a bioactive material, or as a material comprising bioactivity. As used herein, the term "bioactive material" encompasses materials which generate biological responses or activities through the release of a bioactive species. As a non-limiting example, a bioactive glass may leach $Ca^{2+}$ and bioavailable phosphorus (e.g., $PO_4^{3-}$) to induce enamel, dentin, or cementum regeneration. Certain bioactive materials may additionally or alternatively sequester a species from a biological environment, for example by assimilating or intercalating a solute from a biological fluid. A solid material of a composition disclosed herein may be bioactive. In some cases, complete dissolution of a solid material can affect a desired bioactivity, such as dentin filling in teeth proximal to a dental aligner.

A resin can comprise a solid material over a range of weight percentages. A solid material can be a minor constituent of a resin, for example accounting for less than 5 weight percent (wt %), or can account for a majority of the weight of a resin. In some cases, the solid material is present as at least 0.5 wt %, at least 1 wt %, at least 1.5 wt %, at least 2 wt %, at least 2.5 wt %, at least 3 wt %, at least 4 wt %, at least 5 wt %, at least 6 wt %, at least 8 wt %, at least 10 wt %, at least 12 wt %, at least 15 wt %, at least 20 wt %, at least 25 wt %, at least 30 wt %, at least 40 wt %, at least 50 wt %, at least 60 wt %, at least 70 wt %, at least 75 wt %, or at least 80 wt % of a curable resin. In some cases, the solid material is present as at most 80 wt %, at most 75 wt %, at most 70 wt %, at most 60 wt %, at most 50 wt %, at most 40 wt %, at most 30 wt %, at most 25 wt %, at most 20 wt %, at most 15 wt %, at most 12 wt %, at most 10 wt %, at most 8 wt %, at most 6 wt %, at most 5 wt %, at most 4 wt %, at most 3 wt %, at most 2.5 wt %, at most 2 wt %, at most 1.5 wt %, at most 1 wt %, or at most 0.5 wt % of a curable resin. In some cases, the solid material is present between 1 and 5 wt %, between 1 and 10 wt %, between 1 and 20 wt %, between 2 and 5 wt %, between 2 and 10 wt %, between 2 and 20 wt %, between 3 and 6 wt %, between 3 and 10 wt %, between 3 and 20 wt %, between 5 and 10 wt %, between 5 and 25 wt %, between 8 and 20 wt %, between 12 and 25 wt %, between 15 and 30 wt %, between 15 and 40 wt %, between 20 and 35 wt %, between 25 and 50 wt %, between 30 and 50 wt %, between 35 and 65 wt %, between 40 and 65 wt %, between 40 and 80 wt %, between 50 and 75 wt %, or between 60 and 80 wt %. In some cases, the solid material is present between 40 and 70 wt %.

The solid material can comprise a mass of between about 0.05 and about 500 μg per discrete unit (e.g., per particle, fiber, glass shard, etc.). The solid material can comprise a mass of between about 0.05 and about 5 μg, between about 0.1 and about 10 μg, between about 0.25 and about 15 μg, between about 0.5 and about 30 μg, between about 1 and about 50 μg, between about 10 and about 100 μg, or between about 50 and about 500 μg per discrete unit. The solid material can comprise an average width or diameter between about 2 and about 500 microns, between about 2 and about 200 microns, between about 2 and about 100 microns, between about 2 and about 50 microns, between about 2 and about 25 microns, between about 5 and about 500 microns, between about 5 and about 200 microns, between about 5 and about 100 microns, between about 5 and about 50 microns, between about 5 and about 50 microns, between about 5 and about 25 microns, between about 10 and about 500 microns, between about 10 and about 200 microns, between about 10 and about 100 microns, between about 10 and about 50 microns, between about 10 and about 50 microns, between about 10 and about 25 microns, between about 25 and about 500 microns, between about 25 and about 200 microns, between about 25 and about 100 microns, between about 25 and about 50 microns, between about 50 and about 500 microns, between about 50 and about 200 microns, between about 50 and about 100 microns, or between about 100 and about 500 microns.

In some preferred aspects, the solid material comprises a fiber. The fiber can be comprise a length-to-width ratio of between about 100000:1 and about 100:1, between about 50000:1 and about 100:1, between about 10000:1 and about 100:1, between about 5000:1 and about 100:1, between about 100000:1 and about 200:1, between about 50000:1 and about 200:1, between about 10000:1 and about 200:1, between about 5000:1 and about 200:1, between about 100000:1 and about 500:1, between about 50000:1 and about 500:1, between about 10000:1 and about 500:1, between about 5000:1 and about 500:1, or greater than 100000:1. In certain cases, the fiber comprises a width (e.g., a diameter) of between about 2 and about 500 microns, between about 2 and about 200 microns, between about 2 and about 100 microns, between about 2 and about 50 microns, between about 2 and about 25 microns, between about 5 and about 500 microns, between about 5 and about 200 microns, between about 5 and about 100 microns, between about 5 and about 50 microns, between about 5 and about 50 microns, between about 5 and about 25 microns, between about 10 and about 500 microns, between about 10 and about 200 microns, between about 10 and about 100 microns, between about 10 and about 50 microns, between about 10 and about 50 microns, between about 10 and about 25 microns, between about 25 and about 500 microns, between about 25 and about 200 microns, between about 25 and about 100 microns, between about 25 and about 50 microns, between about 50 and about 500 microns, between about 50 and about 200 microns, between about 50 and about 100 microns, or between about 100 and about 500 microns. In some cases, the fiber comprises a length of between about 50 microns and about 100000 microns. In such cases, the length of the fiber may be between about 50 microns and about 2000 microns, between about 50 microns and about 500 microns, between about 100 microns and about 10000 microns, between about 100 microns and about 2000 microns, between about 100 microns and about 1000 microns, between about 200 microns and about 5000 microns, between about 200 microns and about 2000 microns, between about 500 microns and about 10000 microns, between about 500 microns and about 5000 microns, between about 1000 microns and about 25000 microns, between about 1000 microns and about 10000 microns, between about 2000 microns and about 25000 microns, between about 2000 microns and about 10000 microns, between about 5000 microns and about 100000 microns, between about 5000 microns and about 50000 microns, between about 5000 microns and about 25000 microns, between about 10000 microns and about 100000 microns, or between about 10000 microns and about 50000 microns. The fiber can be configured to fully dissolve under a condition. Alternatively, the fiber can be dissolved to fractionate into small segments under the condition. For example, the fiber may comprise a bioglass comprised of aqueous soluble calcium and sodium salts, and aqueous insoluble silica segments which disperse upon dissolution of the calcium and sodium salt segments.

2) Polymerizable Monomers

A curable resin can comprise a polymerizable monomer homogenously or heterogeneously dispersed or patterned therethrough. The degree of heterogenous partitioning (e.g., emulsification) or homogeneity can be controlled with a method or device disclosed herein, for example through agitation prior to resin sheet printing. Such polymerizable monomers can be used as reactive diluents. In many cases, the polymerizable monomer comprises an ethylenically unsaturated functional group capable of undergoing polymerization. In some cases, the ethylenically unsaturated group comprises a vinyl ether, a vinyl amine, a styryl, an acryloyl, a methacryloyl, an acrylamide, a methacrylamide, or a combination thereof. In some cases, the ethylenically unsaturated group comprises an acryloyl or a methacryloyl group. In some cases, the polymerizable monomer comprises an aromatic group.

In various cases, a polymerizable monomer can comprise an acrylate or methacrylate moiety for incorporation into an oligomeric or polymeric backbone, coupled to a linear or cyclic (e.g., mono-, bi-, or tricyclic) side-chain moiety. Generally, any aliphatic, cycloaliphatic or aromatic molecule with a mono-functional polymerizable reactive functional group can be used (also includes liquid crystalline monomers). In some instances, the polymerizable reactive functional groups is an acrylate or methacrylate group. In some aspects, however, no or only low amounts (e.g., 5% w/w or less) of a reactive diluent may be used.

A reactive diluent of the subject compositions typically has a low viscosity. One or more reactive diluents may be included in the composition to reduce the viscosity of the composition, e.g., to a viscosity less than the viscosity of the composition in the absence of the reactive diluent. The reactive diluent(s) may reduce the viscosity of the composition by at least 10%, such as by at least 20%, at least 30%, at least 40%, at least 50%, at least 60%, at least 70%, at least 80%, or at least 90%. The curable composition can comprise 5 to 80 wt %, 5 to 70 wt %, 5 to 60 wt %, 5 to 50 wt %, 5 to 40 wt %, 5 to 30 wt %, 5 to 25 wt %, 5 to 20 wt %, 10 to 70 wt %, 10 to 60 wt %, 10 to 50 wt %, 10 to 40 wt %, 10 to 30 wt %, 10 to 25 wt %, 20 to 70 wt %, 20 to 60 wt %, 20 to 50 wt %, 20 to 40 wt %, 20 to 35 wt %, or 20 to 30 wt %, based on the total weight of the composition, of the reactive diluent. In certain aspects, the curable composition may comprise 5 to 80 wt %, based on the total weight of the composition, of the reactive diluent. In certain aspects, the curable composition may comprise 5 to 50 wt %, based on the total weight of the composition, of the reactive diluent. The reactive diluent of the curable composition may be monofunctional. In some aspects, the reactive diluent comprises a methacrylate. In some aspects, the reactive diluent comprises an acrylate, a methacrylate, a diacrylate, a dimethacrylate, or a compound comprising an acrylate and a methacrylate. In some aspects, the reactive diluent comprises a dimethacrylate. The reactive diluent may be selected from the group consisting of dimethacrylates of polyglycols, hydroxybenzoic acid ester (meth)acrylates, and mixtures thereof. Optionally, the reactive diluent is a cycloalkyl 2-, 3- or 4-((meth)acryloxy)benzoate.

In some aspects, the reactive diluent is a compound of formula (VII):

(VII)

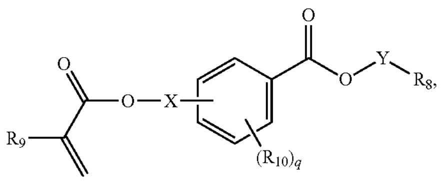

wherein:

- $R_8$ represents optionally substituted $C_3$-$C_{10}$ cycloalkyl, optionally substituted 3- to 10-membered heterocycloalkyl, or optionally substituted $C_6$-$C_{10}$ aryl;
- $R_9$ represents H or $C_1$-$C_6$ alkyl;
- each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;
- each $R_{11}$ independently represents $C_1$-$C_6$ alkyl or $C_1$-$C_6$ alkoxy;
- each $R_{12}$ independently represents $C_1$-$C_6$ alkyl or $C_6$-$C_{10}$ aryl;
- each $R_{13}$ independently represents H or $C_1$-$C_6$ alkyl;
- X is absent, $C_1$-$C_3$ alkylene, 1- to 3-membered heteroalkylene, or $(CH_2CH_2O)_r$;
- Y is absent or $C_1$-$C_6$ alkylene;
- q is an integer from 0 to 4; and
- r is an integer from 1 to 4.

In some aspects, for a compound of formula (VII), $R_8$ may be unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br. Specific reactive diluents suitable for use in the subject compositions are described herein below, including compounds of formula (VI) and (VII). In some aspects, the reactive diluent is selected from TEGDMA (triethylene glycol dimethacrylate) (Aldrich), D4MA (1,12-dodecanediol dimethacrylate) (Aldrich), HSMA (3,3,5-trimethylcyclohexyl 2-(methacryloxy)benzoate) (EAG), BSMA (benzyl salicylate methacrylate) (EAG), a compound of formula (VI), and a compound of formula (VII).

In some aspects, for a compound of formula (VII), $R_8$ is selected from optionally substituted $C_5$-$C_{10}$ cycloalkyl and optionally substituted $C_6$-$C_{10}$ aryl, such as optionally substituted phenyl. In some aspects, $R_8$ is optionally substituted $C_5$-$C_7$ cycloalkyl. The optionally substituted $C_5$-$C_7$ cycloalkyl may have 5 to 15 carbon atoms in total, such as 5 to 12 or 5 to 10 carbon atoms. For a compound of formula (VII), $R_8$ may be a monocyclic cycloalkyl, such as cyclohexyl. In some aspects, $R_8$ is a bicyclic cycloalkyl, such as a bridged, fused, or spirocyclic cycloalkyl. This includes, for example, bicyclo[2.2.1]heptyl, bicyclo[1.1.1]pentyl, spiro[4.4]nonyl, and decahydronaphthyl, each of which may be optionally substituted. In some aspects, $R_8$ is unsubstituted. In some aspects, $R_8$ is substituted with at least one substituent.

Exemplary optional substituents of $R_8$ include $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br. In some aspects, $R_8$ is substituted with at least one —$CH_3$. For example, in some aspects $R_8$ is substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br. In some aspects, $R_8$ is substituted with one or more, linear or branched $C_1$-$C_6$ alkyl, such as methyl, ethyl, n-propyl, iso-propyl, n-butyl, sec-butyl, iso-butyl, or tert-butyl. Two substituents of $R_8$, such as two $C_1$-$C_6$ alkyl, may be connected to form a ring. For example, two substituents on a cyclohexyl group may form a bridge, such as the methylene bridge found in bicyclo[2.2.1]heptyl. In some aspects, $R_8$ is substituted with one or more substituents selected from the group consisting of $C_1$-$C_4$ alkyl and $C_1$-$C_4$ alkoxy.

Exemplary $R_8$ groups include, but are not limited to

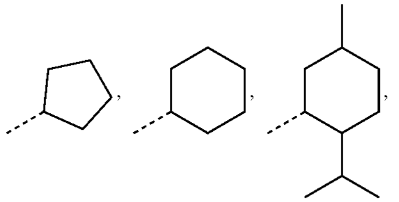

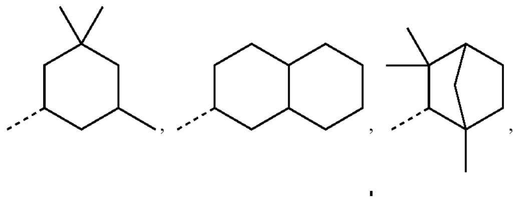

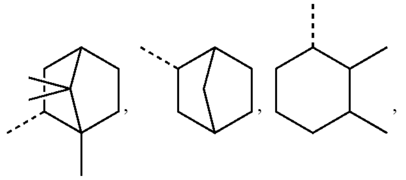

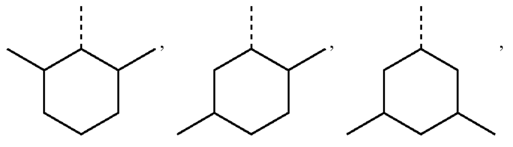

-continued

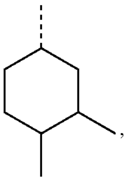, 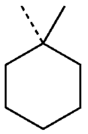, 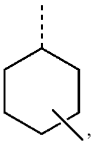,

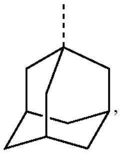, 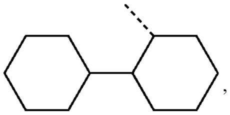,

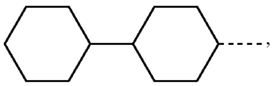, 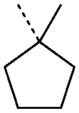,

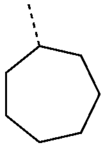, and 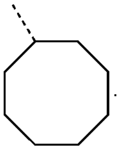.

The broken line is used herein to indicate the bond to the rest of the molecule (e.g., the bond to linker Y of formula (VII)). Further exemplary —Y—$R_8$ groups include, but are not limited to

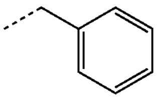, 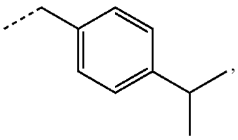,

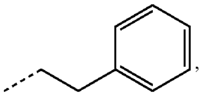, 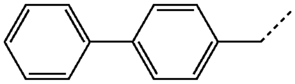,

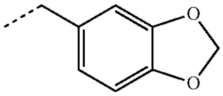, 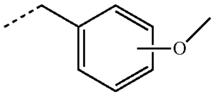,

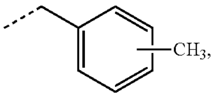, 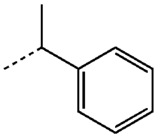,

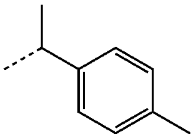, 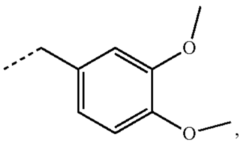,

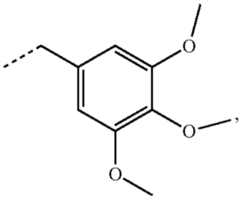, 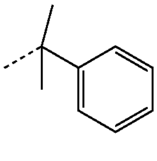,

-continued

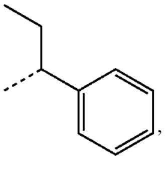, 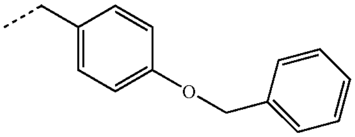,

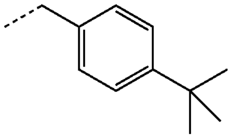,

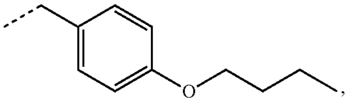,

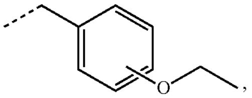, 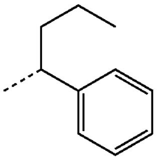,

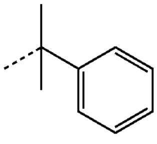, 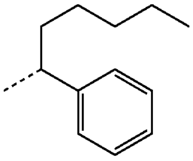,

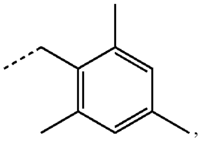, 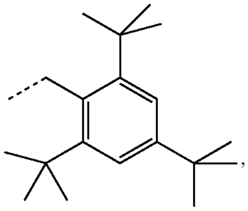,

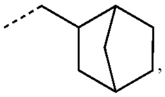, 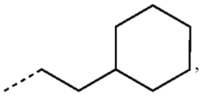, 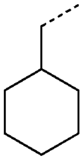,

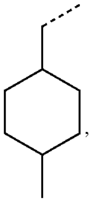, 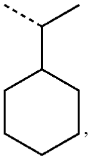, and 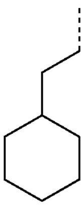.

In some aspects, q is 0 or 1, such as q is 0. In some aspects, $R_9$ is H or $CH_3$. In some aspects, X is $C_1$-$C_3$ alkylene, such as methylene. In some aspects, X is absent. In some aspects, Y is $C_1$-$C_3$ alkylene.

3) Toughness Modifiers

Combining a toughness modifier and a reactive diluent to form a composition of the present disclosure results in a curable composition being well processible at the processing temperatures usually employed in high temperature lithography-based photopolymerization processes, i.e. temperatures between 90° C. and 120° C., as their viscosities at these temperatures are sufficiently low, despite the presence of the high molecular weight toughness modifier. Moreover, as such curable compositions typically comprise multiple divalent polymerizable components, they result in crosslinked polymers, more specifically in crosslinked polymers having excellent thermomechanical properties, as detailed below.

The toughness modifier and the reactive diluent are typically miscible and compatible in the methods described herein. When used in the subject compositions, the toughness modifier may provide for high elongation at break and toughness via strengthening effects, and the reactive diluent may improve the processability of the formulations, particularly of those comprising high amounts of toughness modifiers, while maintaining high values for strength and $T_g$.

A toughness modifier of the subject compositions may have a low glass transition temperature ($T_g$), such as a $T_g$ less than 0° C. In some examples, the $T_g$ of the toughness modifier may be less than 25° C., such as less than 15° C., less than 10° C., less than 5° C., less than 0° C., less than −5° C., or less than −10° C. The $T_g$ of a polymer or composition described herein may be assessed using dynamic mechanical analysis (DMA) and is provided herein as the tan 6 peak.

The toughness modifier can be a component having a low glass transition temperature (e.g., below 0° C.), which can add to tough behavior if used above its glass transition temperature. The toughness modifier can have a molecular weight greater than 5 kDa, 6 kDa, 7 kDa, 8 kDa, 9 kDa, 10 kDa, 11 kDa, 12 kDa, 13 kDa, 14 kDa, 15 kDa, 16 kDa, 17 kDa, 18 kDa, 19 kDa, 20 kDa, 21 kDa, 22 kDa, 23 kDa, 24 kDa, or greater than 25 kDa. In certain aspects, the toughness modifier can have a molecular weight greater than 5 kDa, such as a molecular weight greater than 10 kDa. The curable composition can comprise 10 to 70 wt %, 10 to 60 wt %, 10 to 50 wt %, 10 to 40 wt %, 10 to 30 wt %, 10 to 25 wt %, 20 to 60 wt %, 20 to 50 wt %, 20 to 40 wt %, 20 to 35 wt %, 20 to 30 wt %, 25 to 60 wt %, 25 to 50 wt %, 25 to 45 wt %, 25 to 40 wt %, or 25 to 35 wt %, based on the total weight of the composition, of the toughness modifier. In certain aspects, the curable composition may comprise 25 to 35 wt %, based on the total weight of the composition, of the toughness modifier. In certain aspects, the curable composition may comprise 20 to 40 wt %, based on the total weight of the composition, of the toughness modifier.

The toughness modifier may comprise a polyolefin, a polyester, a polyurethane, a polyvinyl, a polyamide, a polyether, a polyacrylic acid, a polycarbonate, a polysulfone, a polyacrylate, a cellulose-based resin, a polyvinyl chloride resin, a polyvinylidene fluoride, a polyvinylidene chloride, a cycloolefin-based resin, a polybutadiene, a glycidyl methacrylate, or a methyl acrylic ester. For example, the toughness modifier may comprise a urethane group, a carbonate group, or both a urethane group and a carbonate group.

In some aspects, the toughness modifier comprises at least one methacrylate group, such as at least two methacrylate groups. In some aspects, the toughness modifier comprises at least one acrylate. The toughness modifier can be an acrylate selected from an epoxy acrylate (e.g., a Bisphenol A epoxy acrylate), an epoxy methacrylate (e.g., a Bisphenol A epoxy methacrylate), a novolac type epoxy acrylate (e.g., cresol novolac epoxy acrylate or phenol novolac epoxy acrylate), a modified epoxy acrylate (e.g., phenyl epoxy acrylate, aliphatic alkyl epoxy acrylate, soybean oil epoxy acrylate, Photocryl® DP296, Photocryl® E207/25TP, Photocryl® E207/25HD, or Photocryl® E207/30PE), a bisphenol A-glycidyl methacrylate (bis-GMA), a urethane acrylate, an aliphatic urethane acrylate (e.g., aliphatic difunctional acrylate, aliphatic trifunctional acrylate, an acrylate vinyl ester, an aliphatic multifunctional acrylate), an aromatic urethane acrylate (e.g., aromatic difunctional acrylate, aromatic trifunctional acrylate, an aromatic multifunctional acrylate), an urethane dimethacrylate, a polyester acrylate (e.g., trifunctional polyester acrylate, tetrafunctional polyester acrylate, difunctional polyester acrylate, hexafunctional polyester acrylate), a silicone acrylate (e.g., silicone urethane acrylate, silicone polyester acrylate), a melamine acrylate, a dendritic acrylate, an acrylic acrylate, a caprolactone monomer acrylate (e.g., caprolactone methacrylate, caprolactone acrylate), a dodecandediol dimethacrylate, an oligo amine acrylate (e.g., amine acrylate, aminated polyester acrylate), a derivative thereof, or a combination thereof. Non-limiting examples of aliphatic urethane acrylates include difunctional aliphatic acrylates (e.g., Miramer PU210, Miramer PU2100, Miramer PU2560, Miramer SC2404, Miramer SC2565, Miramer UA5216, Miramer U307, Miramer U3195, or Photocryl DP102), trifunctional aliphatic acrylates (e.g., Miramer PU320, Miramer PU340, Miramer PU3450, Miramer U375, or Photocryl DP225), tetrafunctional aliphatic acrylates (e.g., Miramer U3304), hexafunctional aliphatic acrylates (e.g., Miramer MU9800), and multifunctional aliphatic acrylates (e.g., Miramer MU9800 or Miramer SC2152). In some cases, the toughness modifier comprises an acrylate vinyl ester. In some cases, the toughness modifier comprises urethane dimethacrylate, bisphenol A-glycidyl methacrylate (bis-GMA), dodecandediol dimethacrylate, or a combination thereof.

In some aspects, the toughness modifier comprises acrylic monomers selected from n-butyl acrylate, iso-decyl acrylate, n-decyl methacrylate, n-dodecyl acrylate, n-dodecyl methacrylate, 2-ethylhexyl acrylate, 2-(2-ethoxyethoxy)ethyl acrylate, n-hexyl acrylate, 2-methoxyethylacrylate, n-octyl methacrylate, 2-phenylethyl acrylate, n-propyl acrylate, and tetrahydrofurfuryl acrylate. In some aspects, the toughness modifier is a poly(ethersulfone), a poly(sulfone), a poly (etherimide), or a combination thereof. In certain aspects, the toughness modifier is a polypropylene or a polypropylene derivative. In some aspects, the toughness modifier is a rubber or a rubber derivative. In certain aspects, the toughness modifier is a polyethylene or a derivative thereof. In some aspects, the toughness modifier comprises fluorinated acrylic monomers, which can be selected from 1H,1H-heptafluorobutyl acrylate, 1H,1H,3H-hexafluorobutyl acrylate, 1H,1H,5H-octafluoropentyl acrylate, or 2,2,2-trifluoroethyl acrylate.

In some aspects, the toughness modifier is acetaldehyde, allyl glycidyl ether, trans-butadiene, 1-butene, butyl acrylate, sec-butyl acrylate, benzyl acrylate, butyl glydicyl ether, butyl methacrylate, butyl vinyl ether, caprolactone, cis-chlorobutadiene, trans-chlorobutadiene, 2-cyanoethyl acrylate, cyclohexyl acrylate, diethylaminoethyl methacrylate, isobutyl acrylate, isobutylene, isobutyl vinyl ether, cis-isoprene, trans-isoprene, isotatic isopropyl acrylate, 2-methoxyethyl acrylate, methyl acrylate, methyl glicidyl ether, methylphenylsiloxane, methyl vinyl ether, octadecyl methacrylate, 1-octene, octyl methacrylate, dimethylsiloxane, dodecyl acrylate, dodecyl methacrylate, dodecyl vinyl ether, epibromohydrin, epichlorohydrin, 1,2-epoxybutane, 1,2-epoxydecane, 1,2-epoxyoctane, 2-ethoxyethyl acrylate, ethyl acrylate, HDPE ethylene, ethylene adipate, ethylene-trans-1,4-cyclohexyldicarboxylate, ethylene malonate, ethylene oxide, 2-ethylhexyl acrylate, 2-ethylhexyl methacrylate, 2-ethylhexyl vinyl ether, ethyl vinyl ether, formaldehyde, hexyl acrylate, hexadecyl methacrylate, hexyl methacrylate, atactic propylene, isotactic propylene, sydiotatic propylene, propylene oxide, propyl vinyl ether, tetrahydrofuran, tetramethylene adipate, 2,2,2-trifluoroethyl acrylate, trimethylene oxide, vinylidene chloride, vinylidene fluoride, vinyl propionate, a derivative thereof, or a combination thereof.

In some aspects, the toughness modifier (also referred to herein as the toughening modifier) comprises a chlorinated polyethylene, a methacrylate, a copolymer of a chlorinated polyethylene and methacrylate, a derivative thereof, or a combination thereof. In some aspects, the toughening modifier is a rubber powder. In some aspects, the toughening modifier is an anhydride-grafted polymer, an anhydride polymer, or a combination thereof containing epoxy groups. In certain aspects, the anhydride-grafted polymer is a grafted anhydride-modified thermoplastic elastomer, and can comprise a styrene-based thermoplastic elastomer comprising styrene units and units of an olefin (e.g. ethylene, propylene or butene), such as a styrene-butadiene-styrene (SBS), styrene-isoprene-styrene (SIS), styrene-ethylene-butadiene-styrene (SEBS), styrene-ethylene-propylene-styrene (SEPS) copolymers. Suitable anhydrides include unsaturated carboxylic acid anhydride, wherein the carboxylic acid is an acrylic acid, methacrylic acid, α-methyl acrylic acid, maleic acid, fumaric acid, itaconic acid, citraconic acid, tetrahydrophthalic acid, methyl-tetrahydrophthalic acid, or combinations thereof.

In some cases, the toughness modifier comprises a structure according to formula (II), (III), (IV), or (V), wherein:

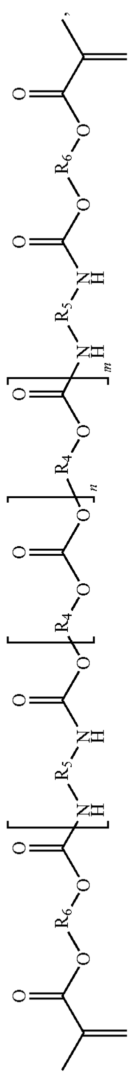
(II)
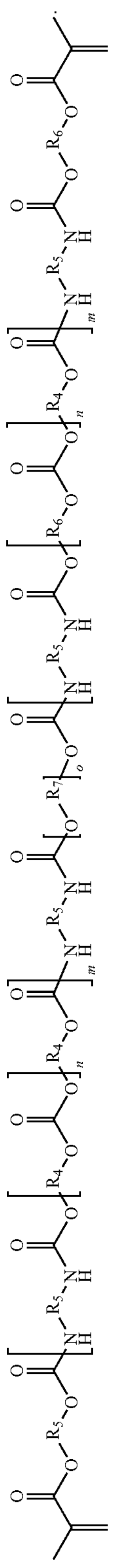
(III)
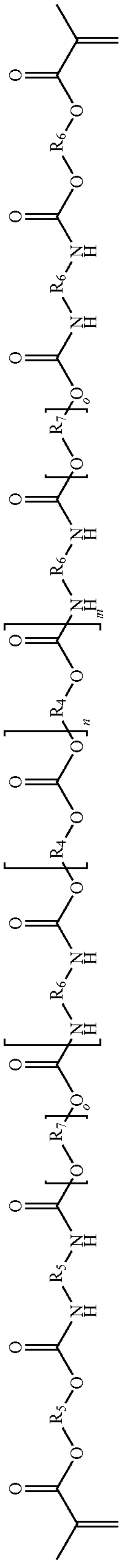
(IV)
or
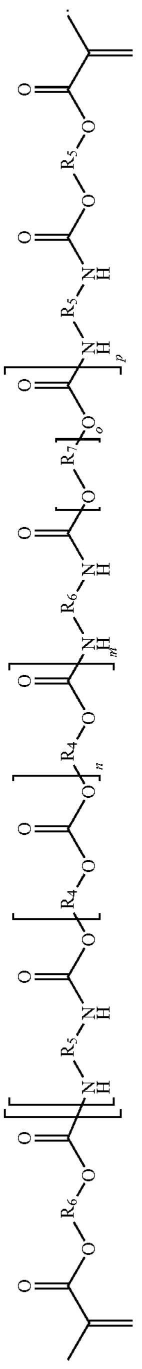
(V)

wherein:

each $R_4$ and each $R_5$ independently represent a divalent, linear, branched or cyclic $C_5$-$C_{15}$ aliphatic radical, each $R_6$ independently represents a divalent, linear or branched $C_2$-$C_4$ alkyl radical, each $R_7$ independently represents a divalent, linear or branched $C_2$-$C_6$ alkyl radical, each n is independently an integer from 1 to 10, each m is independently an integer from 1 to 20, each o is independently an integer from 5 to 50, and p is an integer from 1 to 40, with the proviso that $R_4$, $R_5$, $R_6$, $R_7$, n, m, o and p are selected so as to result in a number average molecular weight of the (poly)carbonate-(poly)urethane dimethacrylate greater than 5 kD.

Specific toughness modifiers suitable for use in the subject compositions are described herein below, including compounds of formula (II), (III), (IV) or (V). In some aspects, the toughness modifier is selected from UA5216 (Miwon), a compound of formula (II), a compound of formula (III), a compound of formula (IV), a compound of formula (V), TNM1, TNM2, TNM3, TNM4, TNM5, and TNM6.

In certain aspects, $R_5$ is a divalent radical originating from a diisocyanate selected from the group consisting of isophorone diisocyanate (IPDI), hexamethylene diisocyanate (HDI), trimethylhexamethylene diisocyanate (2,2,4- and 2,4,4-mixture, TMDI), dicyclohexylmethane 4,4'-diisocyanate (HMDI), 1,3-bis(isocyanatomethyl)cyclohexane, and mixtures thereof.

In some aspects, $R_6$ is a divalent radical originating from a diol independently selected from the group consisting of 1,2-ethanediol, 1,3-propanediol, 1,2-propanediol, 1,4-butanediol, and mixtures thereof. In certain aspects, $R_6$ is a divalent radical originating from 1,2-ethanediol.

In certain aspects, $R_4$ is a divalent radical originating from a diol selected from the group consisting of 2,2-dimethyl-1,3-propanediol (DMP), 1,6-hexanediol, 1,4-cyclohexanedimethanol (CHDM), and mixtures thereof. In some aspects, $R_4$ is the alcoholic moiety of a polycarbonate.

4) Crosslinkers

In some aspects, a curable composition of the present disclosure comprises a crosslinker. The crosslinker may have a sufficient number of polymerizable groups to affect crosslinking in a composition. The crosslinker may comprise at least two, at least three, at least four, at least five, or at least six polymerizable groups. The curable composition may comprise from about 0.5 to about 60 wt %, from about 0.5 to 20 wt %, from about 1 to about 30 wt %, from about 1 to about 10 wt %, from about 1 to about 5 wt %, from about 5 to about 50 wt %, from about 5 to about 20 wt %, from about 10 to about 60 wt %, from about 10 to about 30 wt %, from about 25 to about 50 wt %, from about 30 to about 50 wt %, or from about 40 to about 60 wt % of the crosslinker.

5) Glass Transition Temperature Modifiers

A curable composition of the present disclosure may further comprise 0 to 50 wt %, based on the total weight of the composition, of a glass transition temperature ($T_g$) modifier (also referred to herein as a $T_g$ modifier, a glass transition modifier, a crosslinker, and a cross-linker). The $T_g$ modifier can have a high glass transition temperature, which leads to a high heat deflection temperature, which can be necessary to use a material at elevated temperatures. In some aspects, the curable composition comprises 0 to 80 wt %, 0 to 75 wt %, 0 to 70 wt %, 0 to 65 wt %, 0 to 60 wt %, 0 to 55 wt %, 0 to 50 wt %, 1 to 50 wt %, 2 to 50 wt %, 3 to 50 wt %, 4 to 50 wt %, 5 to 50 wt %, 10 to 50 wt %, 15 to 50 wt %, 20 to 50 wt %, 25 to 50 wt %, 30 to 50 wt %, 35 to 50 wt %, 0 to 40 wt %, 1 to 40 wt %, 2 to 40 wt %, 3 to 40 wt %, 4 to 40 wt %, 5 to 40 wt %, 10 to 40 wt %, 15 to 40 wt %, or 20 to 40 wt % of a $T_g$ modifier. In certain aspects, the curable composition comprises 0-50 wt % of a glass transition modifier. The $T_g$ modifier typically has a higher $T_g$ than the toughness modifier. Optionally, the number average molecular weight of the $T_g$ modifier is 0.4 to 5 kDa. In some aspects, the number average molecular weight of the $T_g$ modifier is from 0.1 to 5 kDa, from 0.2 to 5 kDa, from 0.3 to 5 kDa, from 0.4 to 5 kDa, from 0.5 to 5 kDa, from 0.6 to 5 kDa, from 0.7 to 5 kDa, from 0.8 to 5 kDa, from 0.9 to 5 kDa, from 1.0 to 5 kDa, from 0.1 to 4 kDa, from 0.2 to 4 kDa, from 0.3 to 4 kDa, from 0.4 to 4 kDa, from 0.5 to 4 kDa, from 0.6 to 4 kDa, from 0.7 to 4 kDa, from 0.8 to 4 kDa, from 0.9 to 4 kDa, from 1 to 4 kDa, from 0.1 to 3 kDa, from 0.2 to 3 kDa, from 0.3 to 3 kDa, from 0.4 to 3 kDa, from 0.5 to 3 kDa, from 0.6 to 3 kDa, from 0.7 to 3 kDa, from 0.8 to 3 kDa, from 0.9 to 3 kDa, or from 1 to 3 kDa. The toughness modifier, the reactive diluent and the $T_g$ modifier are typically miscible and compatible in the methods described herein. When used in the subject compositions, the $T_g$ modifier may provide for high $T_g$ and strength values, sometimes at the expense of elongation at break. The toughness modifier may provide for high elongation at break and toughness via strengthening effects, and the reactive diluent may improve the processability of the formulations, particularly of those comprising high amounts of toughness modifiers, while maintaining high values for strength and $T_g$.

The $T_g$ modifier may comprise a urethane group. In some aspects, the $T_g$ modifier comprises at least one methacrylate group. The curable composition may comprise 10 to 20 wt %, based on the total weight of the composition, of the $T_g$ modifier. The $T_g$ modifier may comprise a urethane group. In some aspects, the $T_g$ modifier comprises at least one methacrylate group. The curable composition may comprise 20 to 40 wt %, based on the total weight of the composition, of the $T_g$ modifier. The $T_g$ modifier may comprise a urethane group. In some aspects, the $T_g$ modifier comprises at least one methacrylate group. The curable composition may comprise 10 to 50 wt %, based on the total weight of the composition, of the $T_g$ modifier. Specific $T_g$ modifiers suitable for use in the subject compositions are described herein below, including compounds of formula (I). In some aspects, the $T_g$ modifier is selected from H1188 (bis((2-((methacryloyloxy)methyl)octahydro-1H-4,7-methanoinden-5-yl) methyl) cyclohexane-1,4-dicarboxylate), TGM1, TGM2, TGM3, TGM4, and a compound of formula (I). In some aspects, the $T_g$ modifier is a derivative of H1188 (DMI), TGM1, TGM2, TGM3, TGM4, or a derivative of the compound of formula (I). In some aspects, the $T_g$ modifier is a blend of modifiers comprising H1188 (DMI), TGM1, TGM2, TGM3, TGM4, or a compound of formula (I). In some aspects, the $T_g$ modifier is H1188:

H1188
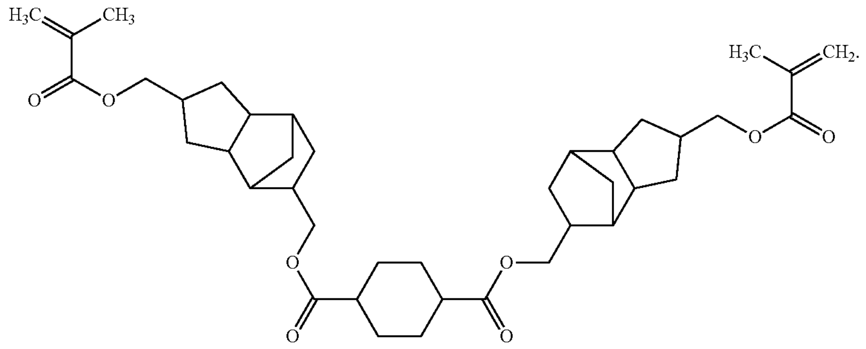
In some aspects, the $T_g$ modifier is TGM1:
TGM1
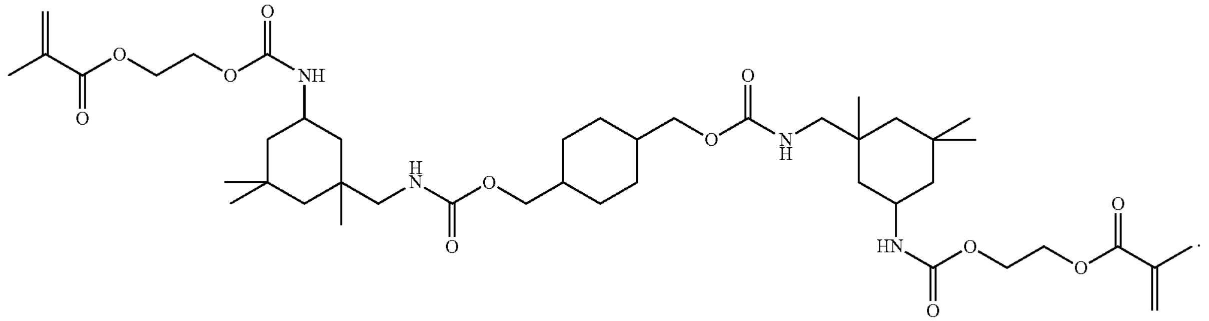
In some aspects, the $T_g$ modifier is TGM2:
TGM2
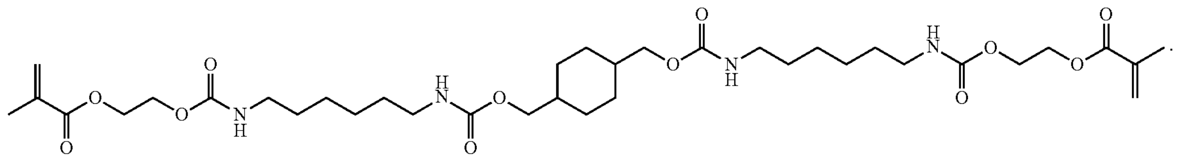
In some aspects, the $T_g$ modifier is TGM3:
TGM3
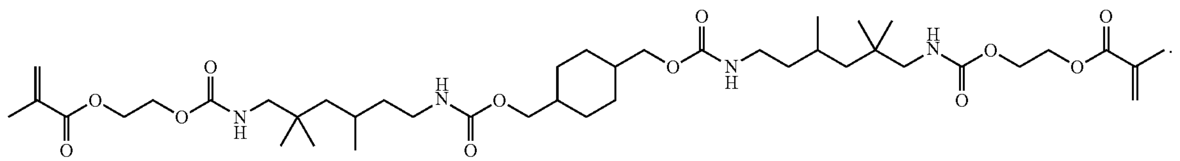

In some aspects, the $T_g$ modifier is TGM4:

TGM4

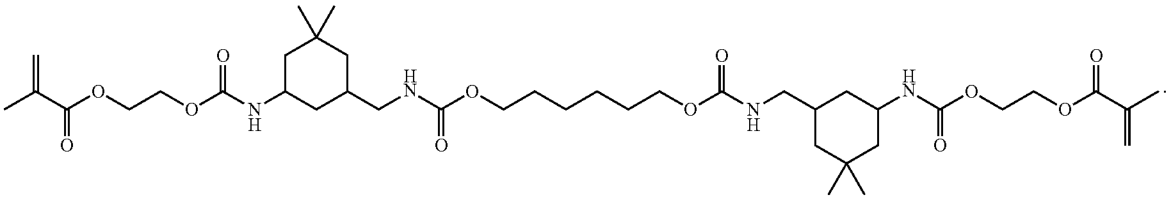

In some aspects, the $T_g$ modifier is a compound of Formula (I):

(I)

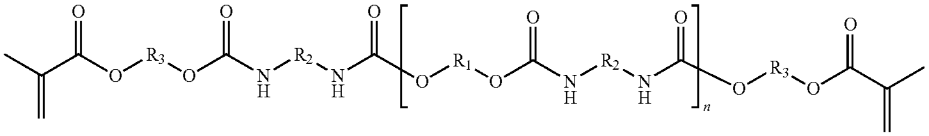

wherein:

each $R_1$ and each $R_2$ independently represent a divalent, linear, branched or cyclic $C_5$-$C_{15}$ aliphatic radical, with the proviso that at least one of $R_1$ and $R_2$ is or comprises a $C_5$-$C_6$ cycloaliphatic structure, each $R_3$ independently represents a divalent, linear or branched $C_2$-$C_4$ alkyl radical, and n is an integer from 1 to 5, with the proviso that $R_1$, $R_2$, $R_3$ and n are selected so as to result in a number average molecular weight of the oligomeric dimethacrylate from 0.4 to 5 kDa.

In some aspects, the $T_g$ modifier comprises a plurality of aliphatic rings. In certain aspects, the $T_g$ modifier comprises a plurality of aliphatic rings. In some aspects, the aliphatic rings are hydrocarbon rings. In some aspects, the aliphatic rings are saturated. In some aspects, the plurality of aliphatic rings comprise cyclobutane, cyclopentane, cyclohexane, cycloheptane, cyclooctane, cyclononane, cyclodecane, or any combination thereof. In some aspects, the plurality of aliphatic rings include bridged ring structures. In some aspects, the plurality of aliphatic rings include fused ring structures. In certain aspects, the middle portion of the $T_g$ modifier comprises a cyclohexane-1,4-dicarboxylic acid, a cyclohexanedimethanol, a cyclohexane-1,4-diylbis(methylene) dicarbamate, or a combination thereof. In certain aspects, the center of the Tg modifier structure comprises a cyclohexane-1,4-diylbis(methylene) dicarbamate (e.g., TGM1, TGM2, and TGM3).

In some aspects, the $T_g$ modifier comprises a methacrylate. In some aspects, the $T_g$ modifier comprises at least two methacrylates. In certain aspects, the $T_g$ modifier has terminal portions comprising methacrylates. In some aspects, the $T_g$ modifier has a structure that terminates at each end with a methacrylate. In some aspects, the $T_g$ modifier is a bis(2-methacrylate) (e.g., TGM1, TGM2, TGM3, TGM4, and H1188).

In some aspects, the $T_g$ modifier comprises a blend of components, selected from TGM1, TGM2, TGM3, TGM4, H1188, a compound of formula (I), D3MA (1,10-decanediol dimethacrylate), D4MA (1,12-dodecanediol dimethacrylate), RDI, LPU624, a derivative thereof, or a combination thereof.

6) Photoinitiators

In various aspects, a curable resin herein is a photo-curable resin. Such photo-curable resin described herein can further comprise one or more photoinitiators. Such photoinitiator, when activated with light of an appropriate wavelength (e.g., UV/VIS) can initiate a polymerization reaction (e.g., during photo-curing) between the telechelic polymers, monomers, and other potentially polymerizable components that may be present in the photo-curable resin, to form a polymeric material as further described herein. Generally, photoinitiators described in the present disclosure can include those that can be activated with light and initiate polymerization of the polymerizable components of the formulation. A "photoinitiator", as used herein, may generally refer to a compound that can produce radical species and/or promote radical reactions upon exposure to radiation (e.g., UV or visible light).

In some aspects, a photo-curable resin herein comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoinitiator. In some aspects, the photoinitiator is a free radical photoinitiator. In certain aspects, the free radical photoinitiator comprises an alpha hydroxy ketone moiety (e.g., 2-hydroxy-2-methylpropiophenone or 1-hydroxycyclohexyl phenyl ketone), an alpha-amino ketone (e.g., 2-benzyl-2-(dimethylamino)-4'-morpholinobutyrophenone or 2-methyl-1-[4-(methylthio)phenyl]-2-morpholinopropan-1-one), 4-methyl benzophenone, an azo compound (e.g., 4,4'-Azobis(4-cyanovaleric acid), 1,1'-Azobis(cyclohexanecarbonitrile, Azobisisobutyronitrile, 2,2'-Azobis(2-methylpropionitrile), or 2,2'-Azobis(2-methylpropionitrile)), an inorganic peroxide, an organic peroxide, or any combination thereof. In some aspects, the composition comprises a photoinitiator comprising SpeedCure TPO-L (ethyl(2,4,6-trimethylbenzoyl) phenyl phosphinate). In some aspects, a photo-curable resin comprises a photoinitiator selected from a benzophenone, a mixture of benzophenone and a tertiary amine containing a carbonyl group which is directly bonded to at least one aromatic ring, and an Irgacure (e.g., Irgacure 907 (2-methyl-1-[4-(methylthio)-phenyl]-2-morpholino-propanone-1) or Irgacure 651 (2,2-dimethoxy-1,2-diphenylethan-1-one). In some aspects, the photoinitiator comprises an acetophenone photoinitiator (e.g., 4'-hydroxyacetophenone, 4' Ophenoxy-acetophenone, 4'-ethoxyaceto-phenone), a benzoin, a benzoin derivative, a benzil, a benzil derivative, a benzophenone (e.g., 4-benzoylbiphenyl, 3,4-(dimethylamino) benzophenone, 2-methylbenzophenone), a cationic photoinitiator (e.g., diphenyliodonium nitrate, (4-iodophenyl)diphenylsulfonium triflate, triphenylsulfonium triflate), an anthraquinone, a quinone (e.g., camphorquinone), a phosphine oxide, a phosphinate, 9,10-phenanthrenequinone, a thioxanthone, any combination thereof, or any derivative thereof.

In some aspects, the photoinitiator can have a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some aspects, the photoinitiator has a maximum wavelength absorbance between 300 to 500 nm.

7) Additives

A curable composition of the present disclosure may further comprise 0.1 to 10 wt %, based on the total weight of the composition, of an additive. Additives may increase the performance or processibility of the composition in direct or additive manufacturing processes. The additive may be selected from a resin, a defoamer and a surfactant, or a combination thereof. A resin included in the composition as an additive may be highly functional, which may reduce the time to gel. One or more defoamers may be added to the composition to reduce foam in the formulation, which may lead to fewer defects (e.g., air pockets) in a polymer prepared from the composition. A surfactant may be added to reduce surface tension of the composition, which may improve processing in an additive manufacturing process, such as 3D-printing. In some aspects, the composition comprises from 0.01 to 20 wt %, from 0.01 to 15 wt %, from 0.01 to 10 wt %, from 0.01 to 9 wt %, from 0.01 to 8 wt %, from 0.01 to 7 wt %, from 0.01 to 6 wt %, from 0.01 to 5 wt %, from 0.1 to 10 wt %, from 0.1 to 9 wt %, from 0.1 to 8 wt %, from 0.1 to 7 wt %, from 0.1 to 6 wt %, from 0.1 to 5 wt %, from 0.5 to 10 wt %, from 0.5 to 9 wt %, from 0.5 to 8 wt %, from 0.5 to 7 wt %, from 0.5 to 6 wt %, from 0.5 to 5 wt %, from 1 to 10 wt %, from 1 to 9 wt %, from 1 to 8 wt %, from 1 to 7 wt %, from 1 to 6 wt %, or from 1 to 5 wt %, based on the total weight of the composition, of an additive. In some aspects, the composition comprises 0.3 to 3.5 wt %, based on the total weight of the composition, of an additive. In some aspects, the defoamer comprises a modified urea (e.g., BYK®-7411 ES, BYK®-7420 ES, and BYK®-7410 ET), a silicone-free foam-destroying polymer (e.g., BYK®-A 535), a composition having a short siloxane backbone and long organic modifications (e.g., TEGO® RAD 2100), a silica-base defoamer, a hydrophobic silica, a wax, a fatty alcohol, a fatty acid, or a wetting component (e.g., a silicone-free wetting compound, such as TEGO® Wet 510). In some aspects, the defoamer is selected from the group consisting of BYK®-7411 ES, BYK®-7420 ES, BYK®-7410 ET, BYK®-A 535, TEGO® RAD2100, and TEGO® WET510. In some aspects, the additive is a surfactant selected from the group consisting of an amphoteric surfactant, a zwitterionic surfactant, an anionic surfactant, a nonionic surfactant, a cationic surfactant, or any combination thereof. The cationic surfactant is selected from quaternary salts, certain amines and combinations thereof. In some aspects, the additive is selected from SIU2400 (Miwon), BDT1006 (Dymax), BYK®-430, and BYK®-A535.

In some aspects, the composition further comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoblocker. The photoblocker can absorb irradiation and prevent or decrease the rate of polymerization or degradation, and its addition to the curable composition can increase the resolution of printable materials. In certain aspects, the photoblocker comprises a hydroquinone, 1,4-dihydroxybenzene, a compound belonging to the HALS (hindered-amine light stabilizer) family, a benzophenone, a benzotriazole, any derivative thereof, or any combination thereof. In some aspects, the photoblocker comprises 2,2'-dihydroxy-4-methoxybenzophenone. In certain aspects, the photoblocker is selected from the group consisting of Michler's ketone, 4-Allyloxy-2-hydroxybenzophenone 99%, 2-(2H-Benzotriazol-2-yl)-4,6-bis(1-methyl-1-phenylethyl)phenolpowder, 2-(2H-Benzotriazol-2-yl)-4,6-di-tert-pentylphenol, 2-(2H-Benzotriazol-2-yl)-6-dodecyl-4-methylphenol, 2-[3-(2H-Benzotriazol-2-yl)-4-hydroxyphenyl]ethyl methacrylate, 2-(2H-Benzotriazol-2-yl)-4-methyl-6-(2-propenyl)phenol, 2-(2H-Benzotriazol-2-yl)-4-(1,1,3,3-tetramethylbutyl)phenol, 2-(4-Benzoyl-3-hydroxyphenoxy)ethyl acrylate, 3,9-Bis(2,4-dicumylphenoxy)-2,4,8,10-tetraoxa-3,9-diphosphaspiro[5.5]undecane, Bis(octadecyl)hydroxylamine powder, 3,9-Bis(octadecyloxy)-2,4,8,10-tetraoxa-3,9-diphosphaspiro[5.5]undecane, Bis(1-octyloxy-2,2,6,6-tetramethyl-4-piperidyl) sebacate, Bis(2,2,6,6-tetramethyl-4-piperidyl) sebacate, 2-tert-Butyl-6-(5-chloro-2H-benzotriazol-2-yl)-4-methylphenol, 2-tert-Butyl-4-ethylphenol, 5-Chloro-2-hydroxybenzophenone, 5-Chloro-2-hydroxy-4-methylbenzophenone, 2,4-Di-tert-butyl-6-(5-chloro-2H-benzotriazol-2-yl)phenol, 2,6-Di-tert-butyl-4-(dimethylaminomethyl) phenol, 3',5'-Dichloro-2'-hydroxyacetophenone, Didodecyl 3,3'-thiodipropionate, 2,4-Dihydroxybenzophenone, 2,2'-Dihydroxy-4-methoxybenzophenone, 2',4'-Dihydroxy-3'-propylacetophenone, 2,3-Dimethylhydroquinone, 2-(4,6-Diphenyl-1,3,5-triazin-2-yl)-5-[(hexyl)oxy]-phenol, 5-Ethyl-1-aza-3,7-dioxabicyclo[3.3.0]octane, Ethyl 2-cyano-3,3-diphenylacrylate, 2-Ethylhexyl 2-cyano-3,3-diphenylacrylate, 2-Ethylhexyl trans-4-methoxycinnamate, 2-Ethylhexyl salicylate, 2-Hydroxy-4-(octyloxy)benzophenone, Menthyl anthranilate, 2-Methoxyhydroquinone, Methyl-p-benzoquinone, 2,2'-Methylenebis[6-(2H-benzotriazol-2-yl)-4-(1,1,3,3-tetramethylbutyl)phenol], 2,2'-Methylenebis(6-tert-butyl-4-ethylphenol), 2,2'-Methylenebis(6-tert-butyl-4-methylphenol), 5,5'-Methylenebis(2-hydroxy-4-methoxybenzophenone), Methylhydroquinone, 4-Nitrophenol sodium salt hydrate, Octadecyl 3-(3,5-di-tert-butyl-4-hydroxyphenyl)propionate, Pentaerythritol tetrakis (3,5-di-tert-butyl-4-hydroxyhydrocinnamate), 2-Phenyl-5-benzimidazolesulfonic acid, Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino], Sodium D-isoascorbate monohydrate, Tetrachloro-1,4-benzoquinone, Triisodecyl phosphite, 1,3,5-Trimethyl-2,4,6-tris(3,5-di-tert-butyl-4-hydroxybenzyl)benzene, Tris(4-tert-butyl-3-hydroxy-2,6-dimethylbenzyl) isocyanurate, Tris(2,4-di-tert-butylphenyl) phosphite, 1,3,5-Tris(2-hydroxyethyl)isocyanurate, and Tris (nonylphenyl) phosphite.

In some aspects, the photoblocker has a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some aspects, the photoblocker has a maximum wavelength absorbance between 300 to 500 nm, such as 300 to 400 nm or 350 to 480 nm.

In some aspects, the composition further comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoinitiator. In some aspects, the photoinitiator is a free radical photoinitiator. In certain aspects, the free radical photoinitiator comprises an alpha hydroxy ketone moiety (e.g., 2-hydroxy-2-methylpropiophenone or 1-hydroxycyclohexyl phenyl ketone), an alpha-amino ketone (e.g., 2-benzyl-2-(dimethylamino)-4'-morpholinobutyrophenone or 2-methyl-1-[4-(methylthio)phenyl]-2-morpholinopropan-1-one), 4-methyl benzophenone, an azo compound (e.g., 4,4'-Azobis(4-cyanovaleric acid), 1,1'-Azobis(cyclohexanecarbonitrile, Azobisisobutyronitrile, 2,2'-Azobis(2-methylpropionitrile), or 2,2'-Azobis(2-methylpropionitrile)), an inorganic peroxide, an organic peroxide, or any combination thereof. In some aspects, the composition comprises a photoinitiator comprising SpeedCure TPO-L (ethyl(2,4,6-trimethylbenzoyl) phenyl phosphinate). In some aspects, the composition comprises a photoinitiator selected from a benzophenone, a mixture of benzophenone and a tertiary amine containing a carbonyl group which is directly bonded to at least one aromatic ring, and an Irgacure (e.g., Irgacure 907 (2-methyl-1-[4-(methylthio)phenyl]-2-morpholino-propanone-1) or Irgacure 651 (2,2-dimethoxy-1,2-diphenylethan-1-one). In some aspects, the photoinitiator comprises an acetophenone photoinitiator (e.g., 4'-hydroxyacetophenone, 4' Ophenoxyacetophenone, 4'-ethoxyacetophenone), a benzoin, a benzoin derivative, a benzil, a benzil derivative, a benzophenone (e.g., 4-benzoylbiphenyl, 3,4-(dimethylamino) benzophenone, 2-methylbenzophenone), a cationic photoinitiator (e.g., diphenyliodonium nitrate, (4-iodophenyl)diphenylsulfonium triflate, triphenylsulfonium triflate), an anthraquinone, a quinone (e.g., camphorquinone), a phosphine oxide, a phosphinate, 9,10-phenanthrenequinone, a thioxanthone, any combination thereof, or any derivative thereof.

In some aspects, the photoinitiator has a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some aspects, the photoinitiator has a maximum wavelength absorbance between 300 to 500 nm.

In some aspects, the additive is a branched dendritic oligomer. In some aspects, the additive has one or more, two or more, three or more, four or more, five or more, six or more, seven or more, eight or more, nine or more, ten or more, or greater than 10 functional groups. In some aspects, the additive has one or more, two or more, three or more, four or more, five or more, six or more, seven or more, eight or more, nine or more, ten or more, or greater than 10 acrylate functional groups. In certain aspects, the branched dendritic oligomer additive is a dendritic acrylate oligomer. In some aspects, the dendritic acrylate oligomer is Bomar™ BDT-1006, Bomar™ BDT-1018, Bomar™ BDT-4330, and the like. In some aspects, the multi-functional additive comprises a silicone urethane acrylate. As a non-limiting example, the silicone urethane acrylate can have 1 functional group, 2 functional groups, 3 functional groups, 4 functional groups, 5 functional groups, 6 functional groups, 7 functional groups, 8 functional groups, 9 functional groups, 10 functional groups, 11 functional groups, 12 functional groups, 13 functional groups, 14 functional groups, 15 functional groups, 16 functional groups, 17 functional groups, 18 functional groups, 19 functional groups, 20 functional groups, or greater than 20 functional groups. In some aspects, the additive can be a silicone urethane acrylate or comprises a silicone urethane acrylate. As a non-limiting example, the silicone urethane acrylate can have 1 acrylate group, 2 acrylate groups, 3 acrylate groups, 4 acrylate groups, 5 acrylate groups, 6 acrylate groups, 7 acrylate groups, 8 acrylate groups, 9 acrylate groups, 10 acrylate groups, 11 acrylate groups, 12 acrylate groups, 13 acrylate groups, 14 acrylate groups, 15 acrylate groups, 16 acrylate groups, 17 acrylate groups, 18 acrylate groups, 19 acrylate groups, 20 acrylate groups, or greater than 20 acrylate groups. As non-limiting examples of silicone acrylates, the additive can be Miramer SIU2400 (a silicone urethane acrylate having a functionality number of 10, diluted with 10% TPGDA) or SIP910 (a silicone polyester acrylate having a functionality number of 2).

II. Printed Materials

The present disclosure provides polymeric materials with controlled constituent distributions. In various aspects, such polymeric materials are printed from curable resins disclosed herein. Such curable resins can comprise solid materials, such as fibers, particles, powders, glasses, and combinations thereof. The curable resins can also comprise one or more polymerizable compounds of the present disclosure, e.g., those described in Formulas (I)-(III). The polymeric material can be generated by affecting a desired component or phase distribution within a curable resin, and then curing the curable resin to fix the component or phase distribution within the material. A polymeric material provided herein can be biocompatible, bioinert, or a combination thereof. In various instances, a polymeric material herein is generated by photo-curing a photo-curable resin described herein.

1) Solid Material Distribution in Polymeric Materials

Differing from previous solid material-containing polymeric materials, in which solid material surface populations follow statistical distributions, a polymeric material disclosed herein can comprise a solid material disposed primarily or exclusively below a surface of the polymer material. Upon curing, a solid material may become fixed in place and orientation within a resultant polymeric material. In cases, a portion of the solid material will become fixed along or extruding from the surface of the hardened polymeric material. According to methods of the present disclosure, the surface exposed or extruding solid material can be selectively removed from the polymeric material without loss of buried, non-exposed solid material. Accordingly, the solid material can enhance a physical property of the polymeric material without affecting its surface properties.

Presented herein are devices comprising (i) a cured resin, and (ii) a solid material dispersed throughout the cured resin, wherein the solid material is not exposed along or extruding from a surface of the cured resin. In some cases, the solid material comprises a fiber. In some cases, the solid material is randomly or homogeneously dispersed throughout the cured resin. In many cases, the cured resin is insoluble under a condition in which the solid material comprises solubility. This property may be exploited to selectively remove surface-exposed and extruding solid material from the cured resin.

A flexural strength, tensile strength, a stiffness, a storage modulus, or elastic modulus of the polymeric material may be at least 1%, at least 2%, at least 3%, at least 5%, at least 8%, at least 10%, at least 15%, at least 20%, at least 25%, at least 30%, at least 40%, at least 50%, at least 75%, at least 100%, at least 150%, at least 200%, at least 250%, at least 300%, at least 400%, at least 500%, or at least 1000% higher when the polymeric material contains a solid material than when the polymeric material lacks the solid material. Accordingly, for a given application, including a solid material in a printed device can diminish the mass and thickness requirements for the polymeric material.

On a mass or volume basis, the polymeric material can comprise at least 0.1%, at least 0.2%, at least 0.3%, at least 0.5%, at least 1%, at least 1.5%, at least 2%, at least 3%, at least 5%, at least 10%, at least 15%, at least 20%, at least 30%, at least 40%, at least 50%, at least 60%, at least 70%, at least 80%, at most 80%, at most 70%, at most 60%, at most 50%, at most 40%, at most 30%, at most 20%, at most 15%, at most 10%, at most 5%, at most 3%, at most 2%, at most 1.5%, at most 1%, at most 0.5%, at most 0.3%, at most 0.2%, or at most 0.1% of the polymeric material. Nonetheless, the polymeric material may cover or extrude from less than 20%, less than 15%, less than 10%, less than 7.5%, less than 5%, less than 2.5%, less than 1%, less than 0.5%, less than 0.2%, less than 0.1%, less than 0.05%, less than 0.02%, less than 0.01%, less than 0.005%, or less than 0.001% of the surface of the polymeric material. For a polymeric material prepared according to a method of the present disclosure, the solid material may cover at least 20%, at least 40%, at least 60%, at least 80%, at least 90%, at least 95%, at least 98%, at least 99%, at least 99.5%, at least 99.8%, or at least 99.9% less surface area than would be expected based on statistical solid material distribution.

2) Crystalline Polymeric Phases

As further described herein, a polymeric material of the present disclosure can comprise one or more crystalline phases, which may be homogenously or heterogeneously dispersed, or may be patterned therethrough. As described herein, a crystalline phase is a polymeric phase of a cured polymeric material that comprises at least one polymer crystal. As disclosed herein, a crystalline phase may consist of a single polymeric crystal, or may comprise a plurality of polymeric crystals.

In certain cases, inclusion of a solid material can affect polymer crystallinity. In many cases, the solid material decreases crystallinity of surrounding polymers by disrupting polymeric Van der Waals, hydrogen bonding, and ionic bonding networks. Accordingly, a printed material comprising a solid material can comprise at least 2%, at least 5%, at least 10%, at least 15%, at least 25%, at least 40%, at least 60%, at least 80%, or at least 90% lower crystallinity than for counterpart printed materials lacking the solid material. Analogously, the presence of the solid material can decrease average crystalline domain size. Whereas a solid material-free polymeric material may comprise crystalline or multilamellar domains spanning the majority of a dimension (e.g., height, width, or depth), inclusion of even a small amount of solid material can diminish crystalline domains to sub-mm or sub-μm sizes.

3) Polymeric Material Properties

In some aspects, the crosslinked polymer is characterized by a stress relaxation of 5% to 85% of the initial load, such as 5% to 45%, 15% to 85%, or 20% to 45% of the initial load. In some aspects, the crosslinked polymer is characterized by a glass transition temperature of 90° C. to 150° C. In some aspects, the crosslinked polymer is characterized by a tensile modulus from 100 MPa to 2000 MPa, such as 800 MPa to 2000 MPa. In some aspects, the crosslinked polymer is characterized by a tensile strength at yield of 5 MPa to 85 MPa, such as 20 MPa to 55 MPa. In some aspects, the crosslinked polymer is characterized by a tensile strength at yield of 25 MPa to 55 MPa. In some aspects, the crosslinked polymer is characterized by an elongation at yield of 4% to 10%, such as 5% to 10%. In some aspects, the crosslinked polymer is characterized by an elongation at break of 5% to 250%, such as 20% to 250%. In some aspects, the crosslinked polymer is characterized by a storage modulus of 300 MPa to 3000 MPa, such as 750 MPa to 3000 MPa. In some aspects, the crosslinked polymer is characterized by a stress relaxation of 0.01 MPa to 15 MPa, such as 2 MPa to 15 MPa. In some aspects, the crosslinked polymer is characterized by a stress relaxation of greater than or equal to 20% of the initial load; a glass transition temperature of greater than or equal to 90° C.; a tensile modulus from 800 MPa to 2000 MPa; and an elongation at break greater than or equal to 20%.

Stress relaxation properties may be assessed using an RSA-G2 instrument from TA Instruments, with a 3-point bending, 2% strain method. The stress relaxation is typically measured at 37° C. and 100% relative humidity and reported as the remaining load after 2 hours, as either the percent (%) of initial load or in MPa). The storage modulus is typically measured at 37° C. and is reported in MPa. The $T_g$ of the crosslinked polymer may be assessed using dynamic mechanical analysis (DMA) and is provided herein as the tan 6 peak. The tensile modulus, tensile strength, elongation at yield and elongation at break may be assessed according to ISO 527-2 5B.

A crosslinked polymer described herein may comprise a first repeating unit having a number average molecular weight of greater than 5 kDa, wherein the first repeating unit comprises carbonate and urethane groups. Optionally, the first repeating unit may be derived from a (poly)carbonate-(poly)urethane dimethacrylate oligomer. In some aspects, the number average molecular weight of the (poly)carbonate-(poly)urethane dimethacrylate oligomer is between 5 kDa to 20 kDa, such as between 10 kDa to 20 kDa. A crosslinked polymer described herein may comprise a second repeating unit having a number average molecular weight of 0.4 to 5 kDa, wherein the second repeating unit comprises a urethane group. The second repeating unit may be derived from a (poly)urethane dimethacrylate oligomer.

III. Methods For Printing Devices

The present disclosure provides methods for synthesizing the polymerizable compound of the present disclosure, methods of using compositions (e.g., resins and polymeric materials) comprising such compounds (e.g., to homogenize or pattern compounds and species within the compositions), as well as methods for generating objects such as medical devices. In cases in which photo-polymerization is used to cure a resin, a polymerizable compound of the present disclosure, e.g., those according to any one of Formulas (I)-(VI), can be used as components in materials applicable many different industries such as transportation (e.g., planes, trains, boats, automobiles, etc.), hobbyist, prototyping, medical, art and design, microfluidics, molds, among others. Such medical devices include, in various aspects herein, orthodontic appliances.

In certain aspects, the present disclosure provides a method of making an orthodontic appliance comprising a crosslinked polymer, the method comprising providing a curable composition described herein; and fabricating the crosslinked polymer by a direct or additive fabrication process. The composition may be exposed to light in said direct or additive fabrication process. The process may further comprise an additional curing step following fabrication of the crosslinked polymer.

1) Methods For Printing Polymeric Materials

The various aspects of the orthodontic appliances presented herein can be fabricated in a wide variety of ways. In some aspects, the orthodontic appliances herein (or portions thereof) can be produced using direct fabrication, such as additive manufacturing techniques (also referred to herein as "3D printing") or subtractive manufacturing techniques (e.g., milling). In some aspects, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some aspects, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some aspects, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some aspects, fused deposition modeling involves melting and selectively depositing a thin filament of thermoplastic polymer in a layer-by-layer manner in order to form an object. In yet another example, material jetting can be used to directly fabricate the appliances herein. In some aspects, material jetting involves jetting or extruding one or more materials onto a build surface in order to form successive layers of the object geometry.

Alternatively or in combination, some aspects of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some aspects, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some aspects, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some aspects, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some aspects, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some aspects, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some aspects, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some aspects, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some aspects, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some aspects, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some aspects, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some aspects, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many aspects, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many aspects, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many aspects, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

2) Methods of Forming Polymeric Materials With Solid Material Additives

A manufacturing method consistent with the present disclosure can comprise: (i) providing a curable resin comprising a solid material dispersed therethrough, (ii) curing a portion of the curable resin, thereby forming a cured resin with a first portion of the solid material buried within the cured resin and a second portion of the solid material outwardly extruding or exposed from a surface of the cured resin; and (iii) removing at least a portion of the second portion of the solid material, thereby forming a surface modified device. The curable resin can contain a polymerizable compound and/or monomer of the present disclosure (e.g., a compound according to any one of Formulas (I)-(III)). In many cases, the curable resin comprises an acrylate or a methacrylate. In some cases the solid material comprises a glass. In some cases, the solid material comprises a fiber. In some cases, the solid material comprises bioactivity. In some cases, the method further comprises separating an uncured portion or the curable resin from the cured resin. In some such cases, the separating is performed between the curing of (ii) and the removing of (iii).

In some cases, the removing of (iii) comprises dissolving the at least a portion of the second portion of the solid material. In some cases, the dissolving comprises use of an aqueous solvent. In many cases, the first portion of the solid material is retained within the cured resin during (iii). The dissolving may be rapid. In some cases, at least 80% of the second portion of the solid material is removed in less than 300 minutes, in less than 180 minutes, in less than 120 minutes, in less than 90 minutes, in less than 60 minutes, in less than 40 minutes, in less than 20 minutes, in less than 10 minutes, in less than 5 minutes, in less than 3 minutes, in less than 2 minutes, in less than 1 minute, or in less than 30 seconds. In many cases, at least 80% of the second portion of the solid material is removed in less than 5 minutes.

In many cases, the curing of (ii) comprises photo-curing. While photo-curing methods such as stereolithography offer unparalleled levels of precision and control during printing, such printing methods can also result in high levels of surface exposure and extrusion of dispersed solid materials (e.g., fibers or nanoparticles). By combining lithography-based method with subsequent or concurrent solid material removal, high levels of printing precision can be coupled with control over solid material distribution. Subsequent to the photo-curing, uncured resin may be separated from the cured resin. In a stereolithography based method, this may involve removing the cured resin from a vat comprising the curable resin.

In some aspects, the photo-curing comprises a single curing step. In some aspects, the photo-curing comprises a plurality of curing steps. In yet other aspects, the photo-curing comprises at least one curing step which exposes the curable resin to light. Exposing the curable resin to light can initiate and/or facilitate photo-polymerization. In some instances, a photoinitiator can be used as part of the resin to accelerate and/or initiate photo-polymerization. In some aspects, the resin is exposed to UV (ultraviolet) light, visible light, IR (infrared) light, or any combination thereof. In some aspects, the cured polymeric material is formed from the photo-curable resin using at least one step comprising exposure to a light source, wherein the light source comprises UV light, visible light, and/or IR light. In some aspects, the light source comprises a wavelength from 10 nm to 200 nm, from 200 nm to 350 nm, from 350 nm to 450 nm, from 450 nm to 550 nm, from 550 nm to 650 nm, from 650 nm to 750 nm, from 750 nm to 850 nm, from 850 nm to 1000 nm, or from 1000 nm to 1500 nm.

In some cases, the method further comprises homogenizing or patterning the solid material. Prior to or concurrently with the curing of (ii), the distribution of the solid material can be affected with a mechanical perturbation, a temperature gradient, an electric field, a magnetic field, or a combination thereof. In some cases, the solid material is homogeneously dispersed prior to or concurrent with the curing of (ii). Such homogenizing may be used to counteract or prevent solid material settling, surface partitioning, or phase partitioning. Alternatively or in addition thereto, the solid material may be patterned or heterogeneously distributed within the curable resin. For example, a mechanical agitator may pattern a solid material along peaks of a transverse or longitudinal wave.

3) Methods of Removing Surface Exposed Solid Material

Surface exposed solid material can be selectively removed from a curable resin (e.g., a highly viscous curable resin with slow solid material diffusion) or polymeric material. In many cases, the removal leaves buried (i.e., non-surface exposed) solid material intact.

Surface exposed solid material removal can be achieved with a range of methods, either alone or in combination. In some cases, surface exposed solid material is removed by dissolution. A solid material consistent with the present disclosure can comprise a higher solubility than the polymeric material or curable resin in which it is disposed within a particular solvent. Exploiting this solubility difference, surface exposed solid material can be dissolved or disintegrated with minimal or no loss of the polymer or resin. Accordingly, a method for forming a device or polymeric material consistent with the present disclosure can comprise immersing the device, polymeric material, or precursor curable resin (e.g., a partially cured resin) within a solvent capable of dissolving the solid material. In some cases, to dissolve the surface exposed solid material, the uncured resin is first removed from the extruded solid material. This requires a two-step process: the remaining uncured resin is first dissolved in a suitable organic solvent, and then the exposed solid material is dissolved.

In particular cases, the solid material may comprise solubility within a biofluid within its intended area of use. For example, a solid material of a dental aligner may be soluble within saliva, or a solid material of an artificial joint may be soluble within synovial fluid. In such cases, the solid material may comprise bioactivity, thereby affecting a biological response in or near its region of use.

IV. Medical Devices and Uses Thereof

The present disclosure provides objects such as medical devices that comprise a polymeric material generated by a method of the present disclosure. As described herein, such polymeric material can comprise a component or formulation of the present disclosure. For example, the polymeric material may comprise, incorporated in its polymeric structure, one or more species of polymerizable compound(s) of this disclosure, e.g., compounds according to formulas (I)-(VII). The polymeric material may also comprise a solid material. In various cases, the device can be a medical device. In some cases, the medical device can be an orthodontic appliance, an implant, a joint replacement, a graft material, an augmentation material, a prosthetic material or a combination thereof.

The medical device can be an orthodontic appliance. The orthodontic appliance can be a dental aligner, a dental expander or a dental spacer. The polymerizable compounds according to the present disclosure can be used as components for viscous or highly viscous photo-curable resins and can result in polymeric materials that can have favorable thermomechanical properties as described herein (e.g., stiffness, stress remaining, etc.) for use in orthodontic appliances, for example, for moving one or more teeth of a patient. The thermomechanical properties may be improved by homogenization, dispersal, or patterning of constituents of the photo-curable resins or materials.

As described herein, the present disclosure provides a method of repositioning a patient's teeth, the method comprising: (i) generating a treatment plan for the patient, the plan comprising a plurality of intermediate tooth arrangements for moving teeth along a treatment path from an initial tooth arrangement toward a final tooth arrangement; (ii) producing a dental appliance comprising a polymeric material described herein, e.g., a polymeric material that comprises, in a polymerized form, compounds according to Formulas (I)-(III) in a homogenous, dispersed, or patterned distribution; and moving on-track, with the dental appliance, at least one of the patient's teeth toward an intermediate tooth arrangement or the final tooth arrangement. Such dental appliance can be produced using processes that include 3D printing, as further described herein. The method of repositioning a patient's teeth can further comprise tracking progression of the patient's teeth along the treatment path after administration of the dental appliance to the patient, the tracking comprising comparing a current arrangement of the patient's teeth to a planned arrangement of the patient's teeth. In such instances, greater than 60% of the patient's teeth can be on track with the treatment plan after 2 weeks of treatment. In some instances, the dental appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth.

In certain aspects, the present disclosure provides an orthodontic appliance comprising a crosslinked polymer described herein. The orthodontic appliance may be an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration, optionally according to a treatment plan.

As used herein, the terms "rigidity" and "stiffness" can be used interchangeably, as are the corresponding terms "rigid" and "stiff" As used herein a "plurality of teeth" encompasses two or more teeth.

In many aspects, one or more posterior teeth comprises one or more of a molar, a premolar or a canine, and one or more anterior teeth comprising one or more of a central incisor, a lateral incisor, a cuspid, a first bicuspid or a second bicuspid.

In some aspects, the compositions and methods described herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The aspects disclosed herein are well suited for moving one or more teeth of the first group of one or more teeth or moving one or more of the second group of one or more teeth, and combinations thereof.

The aspects disclosed herein are well suited for combination with one or more known commercially available tooth moving components such as attachments and polymeric shell appliances. In many aspects, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the aspects disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof, for example. In some cases, the reinforced composites can comprise a polymer matrix reinforced with ceramic or metallic particles, for example. The appliance can be shaped in many ways, such as with thermoforming or direct fabrication as described herein, for example. Alternatively, or in combination, the appliance can be fabricated with machining such as an appliance fabricated from a block of material with computer numeric control machining. In some cases, the appliance is fabricated using a polymerizable compound according to the present disclosure, for example, using the monomers as reactive diluents for curable resins.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some aspects, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
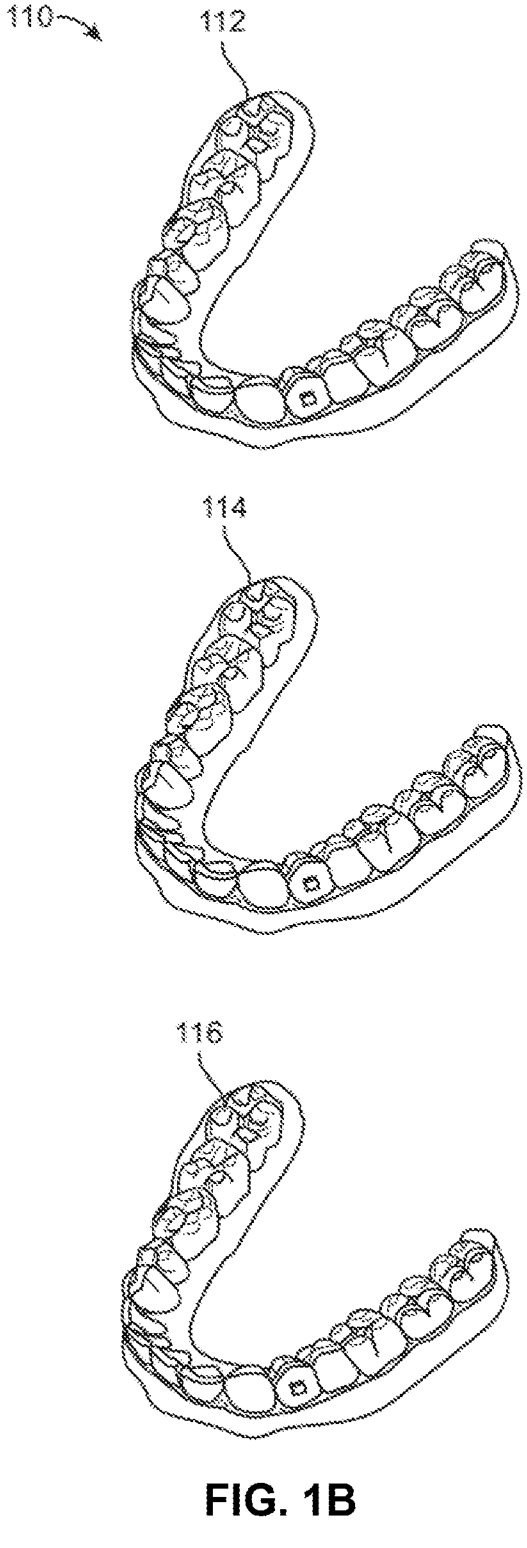
FIG. 1B illustrates a tooth repositioning system, in accordance with aspects of the present disclosure.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
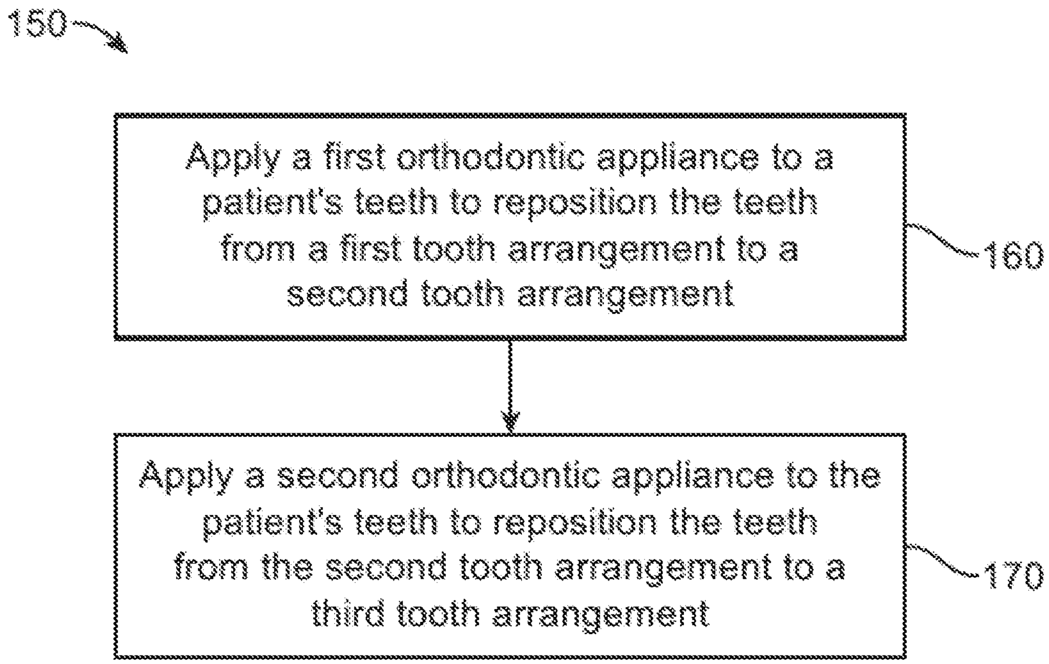
FIG. 1C illustrates a method of orthodontic treatment using a plurality of appliances, in accordance with aspects of the present disclosure.

FIG. 1C illustrates a method 150 of orthodontic treatment using a plurality of appliances, in accordance with aspects. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
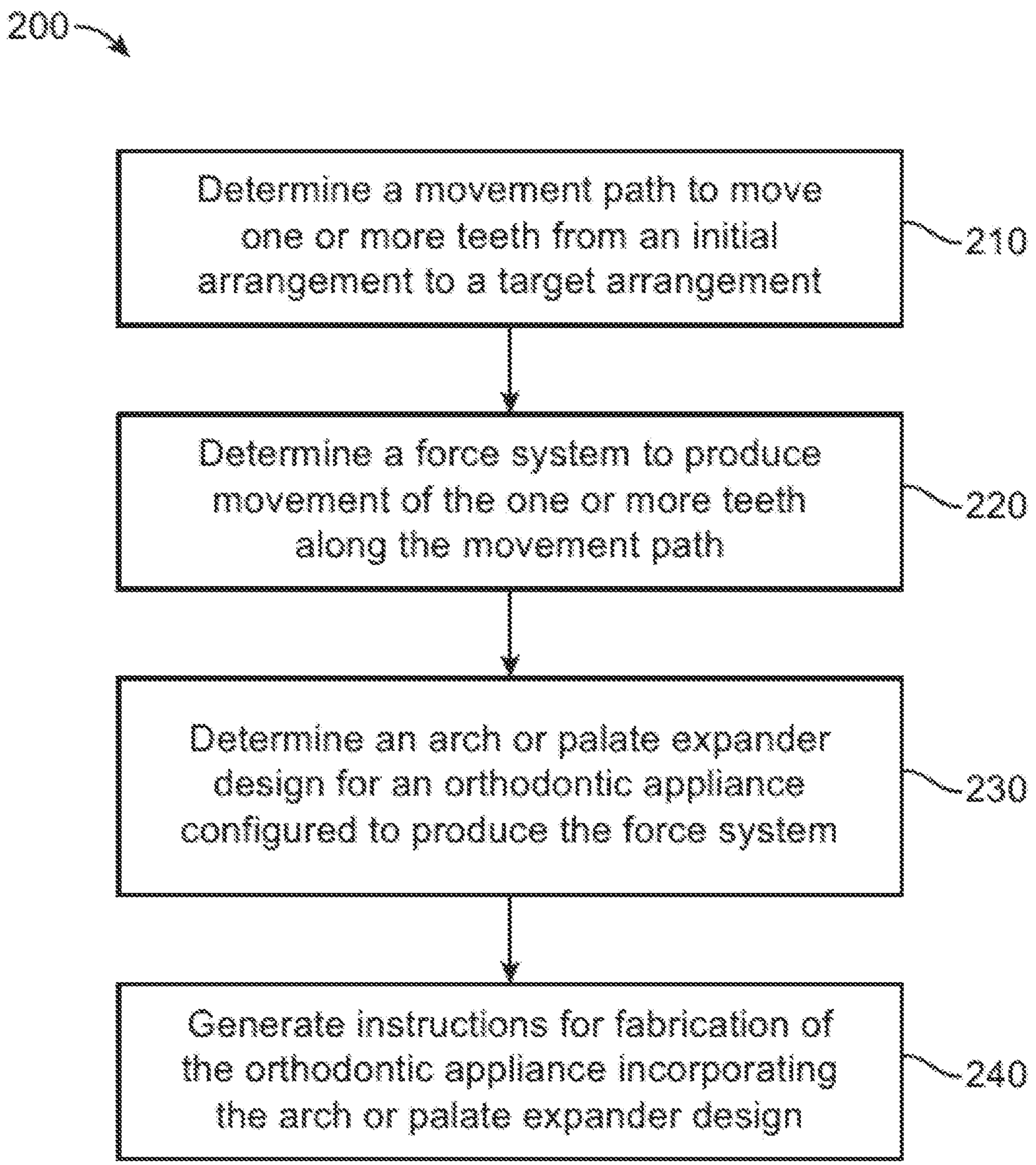
FIG. 2 illustrates a method for designing an orthodontic appliance, in accordance with aspects of the present disclosure.

FIG. 2 illustrates a method 200 for designing an orthodontic appliance to be produced by direct fabrication, in accordance with aspects. The method 200 can be applied to any aspect of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some aspects, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some aspects, the thickness and/or density of the mid-palatal suture may be measured, or input by a treating professional. In other aspects, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systemes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some aspects, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative aspects, the instructions can be configured for indirect fabrication of the appliance, e.g., by thermoforming.

Method 200 may comprise additional steps: 1) The upper arch and palate of the patient is scanned intraorally to generate three dimensional data of the palate and upper arch; 2) The three dimensional shape profile of the appliance is determined to provide a gap and teeth engagement structures as described herein.

Although the above steps show a method 200 of designing an orthodontic appliance in accordance with some aspects, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the aspects described herein. Some of the steps may be optional, and the order of the steps can be varied as desired.

Figure 3:
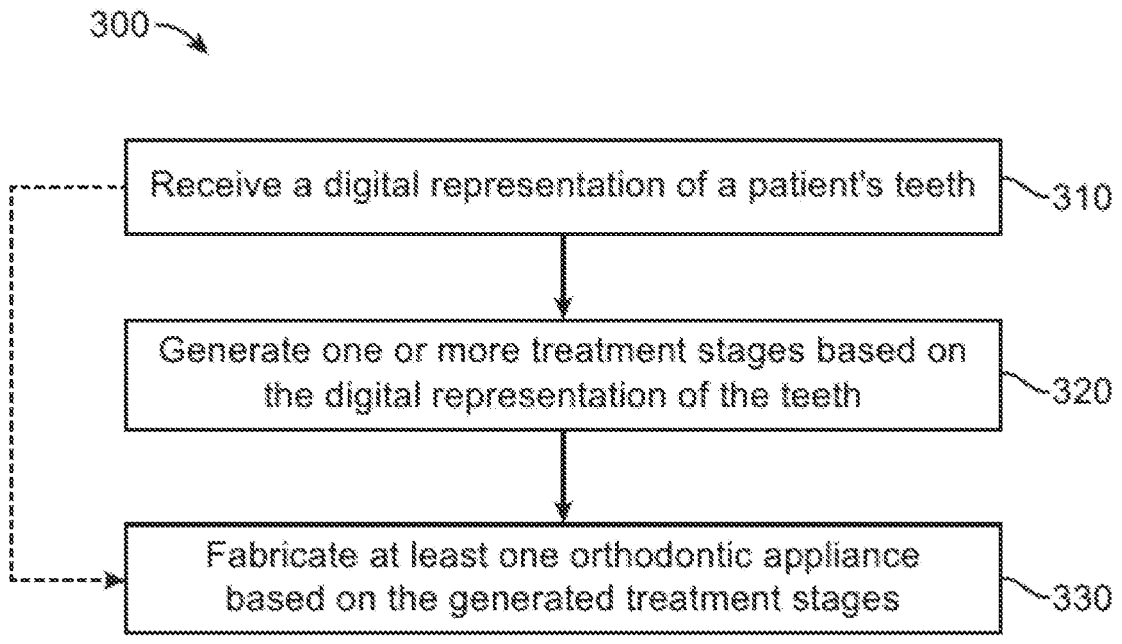
FIG. 3 illustrates a method for digitally planning an orthodontic treatment, in accordance with aspects of the present disclosure.

FIG. 3 illustrates a method 300 for digitally planning an orthodontic treatment and/or design or fabrication of an appliance, in accordance with aspects. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation

V. Definitions

All terms, chemical names, expressions and designations have their usual meanings which are well-known to those skilled in the art. As used herein, the terms "to comprise" and "comprising" are to be understood as non-limiting, i.e., other components than those explicitly named may be included.

Number ranges are to be understood as inclusive, i.e., including the indicated lower and upper limits. Furthermore, the term "about", as used herein, and unless clearly indicated otherwise, generally refers to and encompasses plus or minus 10% of the indicated numerical value(s). For example, "about 10%" may indicate a range of 9% to 11%, and "about 1" may include the range 0.9-1.1.

As used herein, the term "polymer" generally refers to a molecule composed of repeating structural units connected by covalent chemical bonds and characterized by a substantial number of repeating units (e.g., equal to or greater than 20 repeating units and often equal to or greater than 100 repeating units and often equal to or greater than 200 repeating units) and a molecular weight greater than or equal to 5,000 Daltons (Da) or 5 kDa, such as greater than or equal to 10 kDa, 15 kDa, 20 kDa, 30 kDa, 40 kDa, 50 kDa, or 100 kDa. Polymers are commonly the polymerization product of one or more monomer precursors. The term polymer includes homopolymers, i.e., polymers consisting essentially of a single repeating monomer species. The term polymer also includes copolymers which are formed when two or more different types (or species) of monomers are linked in the same polymer. Copolymers may comprise two or more different monomer species, and include random, block, alternating, segmented, grafted, tapered and other copolymers. The term "cross-linked polymers" generally refers to polymers having one or multiple links between at least two polymer chains, which can result from multivalent mono mers forming cross-linking sites upon polymerization. In various aspects, a polymer herein is a telechelic polymer capable of undergoing further polymerization reactions, e.g., with other polymerizable components present in a curable resin.

As used herein, the term "oligomer" generally refers to a molecule composed of repeating structural units connected by covalent chemical bonds and characterized by a number of repeating units less than that of a polymer (e.g., equal to or less than 20 or less than 10 repeating units) and a lower molecular weight than polymers, e.g., less than 5,000 Da or less than 2,000 Da, and in various cases from about 0.5 kDa to about 5 kDa. In some case, oligomers may be the polymerization product of one or more monomer precursors. In various aspects, an oligomer herein is a telechelic oligomer capable of undergoing further polymerization reactions, e.g., with other polymerizable components present in a curable resin.

As used herein, the term "reactive diluent" generally refers to a substance which reduces the viscosity of another substance, such as a monomer or curable resin. A reactive diluent may become part of another substance, such as a polymer obtained by a polymerization process. In some examples, a reactive diluent is a curable monomer which, when mixed with a curable resin, reduces the viscosity of the resultant formulation and is incorporated into the polymer that results from polymerization of the formulation.

Oligomer and polymer mixtures can be characterized and differentiated from other mixtures of oligomers and polymers by measurements of molecular weight and molecular weight distributions.

The average molecular weight (M) is the average number of repeating units n times the molecular weight or molar mass ($M_i$) of the repeating unit. The number-average molecular weight ($M_n$) is the arithmetic mean, representing the total weight of the molecules present divided by the total number of molecules.

As used herein, the term "fiber" can refer to an elongated material comprising a length in considerable excess of its height and width. For example, a fiber can be a substantially cylindrical material with a length of at least 50, at least 100, or at least 200 times its diameter. A fiber can comprise a range of materials, including polymers, glasses, ceramics, metals, composites, and combinations thereof. Optionally, a fiber can comprise a hollow cavity extending along a portion or the entirety of its length.

Photoinitiators described in the present disclosure can include those that can be activated with light and initiate polymerization of the polymerizable components of a resin or formulation. A "photoinitiator", as used herein, may generally refer to a compound that can produce radical species and/or promote radical reactions upon exposure to radiation (e.g., UV or visible light).

The term "biocompatible," as used herein, refers to a material that does not elicit an immunological rejection or detrimental effect, referred herein as an adverse immune response, when it is disposed within an in-vivo biological environment. For example, in aspects a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some aspects, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some aspects, the disclosure provides bioinert devices.

As used herein, the terms “homogenous” and “homogeneity” may refer to uniformity in a constituent distribution or a property of a composition or material. In some cases, homogenous denotes distributional uniformity at the microscopic, nanoscopic, or chemical level. In some cases, homogenous refers to random distributions of components within a composition or material. In some cases, homogenous denotes spatially invariant chemical or physical properties (e.g., spatially uniform hardness or color) of a composition or material.

As used herein, the terms “heterogenous” and “heterogeneity” may refer to nonuniformity in a constituent distribution or a property of a composition or material. In some cases, “heterogenous” denotes partitioning or patterning within a composition or material. For example, an emulsion may be heterogenous to the degree that two or more components separate into distinct phases. In some cases, heterogenous denotes spatial variance in chemical or physical properties of a composition or material. In some cases, heterogenous denotes nonuniform crystallinity over a portion of a composition or material.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individually or in any combination. Additionally, unless otherwise specified, all isotopic variants of compounds disclosed herein are intended to be encompassed by the disclosure. Specific names of compounds are intended to be exemplary, as it is known that one of ordinary skill in the art can name the same compounds differently.

It is noted that as used herein and in the appended claims, the singular forms “a”, “an”, and “the” include plural reference unless the context clearly dictates otherwise. Thus, for example, reference to “a monomer” includes a plurality of such monomers and equivalents thereof known to those skilled in the art, and so forth. As well, the terms “a” (or “an”), “one or more” and “at least one” can be used interchangeably herein. It is also to be noted that the terms “comprising”, “including”, and “having” can be used interchangeably.

As used herein, “comprising” is synonymous with “including,” “containing,” or “characterized by,” and is inclusive or open-ended and does not exclude additional, unrecited elements or method steps. As used herein, “consisting of” excludes any element, step, or ingredient not specified in the claim element. As used herein, “consisting essentially of” does not exclude materials or steps that do not materially affect the basic and novel characteristics of the claim.

As used herein, the term “group” may refer to a reactive functional group of a chemical compound. Groups of the present compounds refer to an atom or a collection of atoms that are a part of the compound. Groups of the present disclosure may be attached to other atoms of the compound via one or more covalent bonds. Groups may also be characterized with respect to their valence state. The present disclosure includes groups characterized as monovalent, divalent, trivalent, etc. valence states.

As used herein, the term “substituted” refers to a compound (e.g., an alkyl chain) wherein a hydrogen is replaced by another reactive functional group or atom, as described herein.

As used herein, a broken line in a chemical structure can be used to indicate a bond to the rest of the molecule. For example,  in

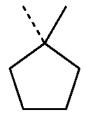

is used to designate the 1-position as the point of attachment of 1-methylcyclopentate to the rest of the molecule. Alternatively,

in, e.g.,

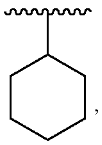, can be used to indicate that the given moiety, the cyclohexyl moiety in this example, is attached to a molecule via the bond that is “capped” with the wavy line.

Alkyl groups include straight-chain, branched and cyclic alkyl groups, unless otherwise defined for a compound or genus of compounds. Alkyl groups include those having from 1 to 30 carbon atoms, unless otherwise defined. Thus, alkyl groups can include small alkyl groups having 1 to 3 carbon atoms, medium length alkyl groups having from 4-10 carbon atoms, as well as long alkyl groups having more than 10 carbon atoms, particularly those having 10-30 carbon atoms. The term cycloalkyl specifically refers to an alky group having a ring structure such as a ring structure comprising 3-30 carbon atoms, optionally 3-20 carbon atoms and optionally 3-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6, 7- or 8-member ring(s). The carbon rings in cycloalkyl groups can also carry alkyl groups. Cycloalkyl groups can include bicyclic and tricyclic alkyl groups. Alkyl groups are optionally substituted, as described herein. Substituted alkyl groups can include among others those which are substituted with aryl groups, which in turn can be optionally substituted. Specific alkyl groups include methyl, ethyl, n-propyl, isopropyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Unless otherwise defined herein, substituted alkyl groups include fully halogenated or semihalogenated alkyl groups, such as alkyl groups having one or more hydrogens replaced with one or more fluorine atoms, chlorine atoms, bromine atoms and/or iodine atoms. Thus, substituted alkyl groups can include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alkyl portion of the groups is substituted as provided herein in connection with the description of alkyl groups. As used herein MeO— refers to $CH_3O$—. Moreover, a thioalkoxy group, as used herein is an alkyl group that has been modified by linkage to sulfur atom (instead of an oxygen) and can be represented by the formula R—S.

Alkenyl groups include straight-chain, branched and cyclic alkenyl groups. Alkenyl groups include those having 1, 2 or more double bonds and those in which two or more of the double bonds are conjugated double bonds. Unless otherwise defined herein, alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9-or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Unless otherwise defined herein, substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups can include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-membered aromatic rings, including heterocyclic aromatic rings. The term heteroaryl specifically refers to aryl groups having at least one 5-, 6-, 7- or 8-member heterocyclic aromatic ring. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, 0 or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the disclosure at any suitable point of attachment. In some aspects, aryl groups contain between 5 and 30 carbon atoms. In some aspects, aryl groups contain one aromatic or heteroaromatic six-member ring and one or more additional five- or six-member aromatic or heteroaromatic ring. In aspects, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group "—$CH_2$—" derived from an alkyl group as defined herein. The disclosure includes compounds having one or more alkylene groups. Alkylene groups in some compounds function as attaching and/or spacer groups. Compounds of the disclosure may have substituted and/or unsubstituted $C_1$-$C_{20}$ alkylene, $C_1$-$C_{10}$ alkylene and $C_1$-$C_6$ alkylene groups.

As used herein, the terms "cycloalkylene" and "cycloalkylene group" are used synonymously and refer to a divalent group derived from a cycloalkyl group as defined herein. The disclosure includes compounds having one or more cycloalkylene groups. Cycloalkyl groups in some compounds function as attaching and/or spacer groups. Compounds of the disclosure may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The disclosure includes compounds having one or more arylene groups. In some aspects, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the disclosure include substituted and/or unsubstituted $C_5$-$C_{30}$ arylene, $C_5$-$C_{20}$ arylene, $C_5$-$C_{10}$ arylene and $C_6$-$C_{10}$ arylene groups.

As used herein, the terms "heteroarylene" and "heteroarylene group" are used synonymously and refer to a divalent group derived from a heteroaryl group as defined herein. The disclosure includes compounds having one or more heteroarylene groups. In some aspects, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the disclosure include substituted and/or unsubstituted $C_5$-$C_{30}$ heteroarylene, $C_5$-$C_{20}$ heteroarylene, $C_5$-$C_{10}$ heteroarylene and $C_6$-$C_{10}$ heteroarylene groups.

As used herein, the terms "alkenylene" and "alkenylene group" are used synonymously and refer to a divalent group derived from an alkenyl group as defined herein. The disclosure includes compounds having one or more alkenylene groups. Alkenylene groups in some compounds function as attaching and/or spacer groups. Compounds of the disclosure include substituted and/or unsubstituted $C_2$-$C_{20}$ alkenylene, $C_2$-$C_{10}$ alkenylene and $C_2$-$C_5$ alkenylene groups.

As used herein, the terms "cycloalkenylene" and "cycloalkenylene group" are used synonymously and refer to a divalent group derived from a cycloalkenyl group as defined herein. The disclosure includes compounds having one or more cycloalkenylene groups. Cycloalkenylene groups in some compounds function as attaching and/or spacer groups. Compounds of the disclosure include substituted and/or unsubstituted $C_3$-$C_{20}$ cycloalkenylene, $C_3$-$C_{10}$ cycloalkenylene and $C_3$-$C_5$ cycloalkenylene groups.

As used herein, the terms "alkynylene" and "alkynylene group" are used synonymously and refer to a divalent group derived from an alkynyl group as defined herein. The disclosure includes compounds having one or more alkynylene groups. Alkynylene groups in some compounds function as attaching and/or spacer groups. Compounds of the disclosure include substituted and/or unsubstituted $C_2$-$C_{20}$ alkynylene, $C_2$-$C_{10}$ alkynylene and $C_2$-$C_5$ alkynylene groups.

As used herein, the terms "halo" and "halogen" can be used interchangeably and refer to a halogen group such as a fluoro (—F), chloro (—Cl), bromo (—Br) or iodo (—I)

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and reactive functional groups, for example, provided as substituents.

The term "carbocyclic" refers to ring structures containing only carbon atoms in the ring. Carbon atoms of carbocyclic rings can be bonded to a wide range of other atoms and reactive functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl -(alkoxy)$_n$ alkoxy wherein n is an integer from 1 to 10, e.g., 1 to 4, and in some aspects 1 to 3.

The term "heteroalkyl", as used herein, generally refers to an alkyl, alkenyl or alkynyl group as defined herein, wherein at least one carbon atom of the alkyl group is replaced with a heteroatom. In some instances, heteroalkyl groups may contain from 1 to 18 non-hydrogen atoms (carbon and heteroatoms) in the chain, or from 1 to 12 non-hydrogen atoms, or from 1 to 6 non-hydrogen atoms, or from 1 to 4 non-hydrogen atoms. Heteroalkyl groups may be straight or branched, and saturated or unsaturated. Unsaturated heteroalkyl groups have one or more double bonds and/or one or more triple bonds. Heteroalkyl groups may be unsubstituted or substituted. Exemplary heteroalkyl groups include, but are not limited to, alkoxyalkyl (e.g., methoxymethyl), and aminoalkyl (e.g., alkylaminoalkyl and dialkylaminoalkyl). Heteroalkyl groups may be optionally substituted with one or more substituents.

The term "carbonyl", as used herein, for example in the context of $C_{1-6}$ carbonyl substituents, generally refers to a carbon chain of given length (e.g., $C_{1-6}$), wherein each of the carbon atom of a given carbon chain can form the carbonyl bond, as long as it chemically feasible in terms of the valence state of that carbon atom. Thus, in some instance, the "$C_{1-6}$ carbonyl" substituent refers to a carbon chain of between 1 and 6 carbon atoms, and either the terminal carbon contains the carbonyl functionality, or an inner carbon contains the carbonyl functionality, in which case the substituent could be described as a ketone. The term "carboxy", as used herein, for example in the context of $C_{1-6}$ carboxyl substituents, generally refers to a carbon chain of given length (e.g., $C_{1-6}$), wherein a terminal carbon contains the carboxy functionality, unless otherwise defined herein.

As to any of the groups described herein that contain one or more substituents, it is understood that such groups do not contain any substitution or substitution patterns which are sterically impractical and/or synthetically non-feasible. In addition, the compounds of this disclosure include all stereochemical isomers arising from the substitution of these compounds.

Unless otherwise defined herein, optional substituents for any alkyl, alkenyl and aryl group includes substitution with one or more of the following substituents, among others:

halogen, including fluorine, chlorine, bromine or iodine;

pseudohalides, including —CN, —OCN (cyanate), —NCO (isocyanate), —SCN (thiocyanate) and —NCS (isothiocyanate);

—COOR, where R is a hydrogen or an alkyl group or an aryl group and more specifically where R is a methyl, ethyl, propyl, butyl, or phenyl group all of which groups are optionally substituted;

—COR, where R is a hydrogen or an alkyl group or an aryl group and more specifically where R is a methyl, ethyl, propyl, butyl, or phenyl group all of which groups are optionally substituted;

—$CON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$OCON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$N(R)_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—$SO_2R$, or —SOR, where R is an alkyl group or an aryl group and more specifically where R is a methyl, ethyl, propyl, butyl, or phenyl group, all of which are optionally substituted;

—OCOOR, where R is an alkyl group or an aryl group;

—$SO_2N(R)_2$, where each R, independently of each other R, is a hydrogen, or an alkyl group, or an aryl group all of which are optionally substituted and wherein R and R can form a ring that can contain one or more double bonds and can contain one or more additional carbon atoms; and —OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, as further described herein, the compounds of this disclosure can include all stereochemical isomers (and racemic mixtures) arising from the substitution of these compounds.

VI. Experimental Methods

All chemicals were purchased from commercial sources and were used without further purification, unless otherwise stated.

In some aspects, the stress relaxation of a material or device can be measured by monitoring the time-dependent stress resulting from a steady strain. The extent of stress relaxation can also depend on the temperature, relative humidity and other applicable conditions (e.g., presence of water). In aspects, the test conditions for stress relaxation are a temperature of 37±2° C. at 100% relative humidity or a temperature of 37±2° C. in water.

In aspects, the crosslinked polymers are characterized by a tensile stress-strain curve that displays a yield point after which the test specimen continues to elongate, but there is no increase in load. Such yield point behavior typically occurs "near" the glass transition temperature, where the material is between the glassy and rubbery regimes and may be characterized as having viscoelastic behavior. In aspects, viscoelastic behavior is observed in the temperature range 20° C. to 40° C. The yield stress is determined at the yield point. In some aspects, the yield point follows an elastic region in which the slope of the stress-strain curve is constant or nearly constant. In aspects, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by ln (l/l0), which may be approximated by (l−l0)/l0 at small strains (e.g. less than approximately 10%) and the elongation is l/l0, where l is the gauge length after some deformation has occurred and l0 is the initial gauge length. The mechanical properties can depend on the temperature at which they are measured. The test temperature may be below the expected use temperature for a dental appliance such as 35° C. to 40° C. In aspects, the test temperature is 23±2° C.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. The viscosity of a composition described herein may be measured at 110° C. using a rheometer. For example, an MCR 301 rheometer from Anton Paar may be used for rheological measurement in rotation mode (PP-25, 50 s-1, 50-115° C., 3° C./min).

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. For example, an MCR 301 rheometer from Anton Paar may be used for rheological measurement in rotation mode (PP-25, 50 s-1, 50-115° C., 3° C./min).

Determining the water content when fully saturated at use temperature can comprise exposing the polymeric material to 100% humidity at the use temperature (e.g., 40° C.) for a period of 24 hours, then determining water content by methods known in the art, such as by weight.

In some aspects, the presence of a crystalline phase and an amorphous phase provide favorable material properties to the polymeric materials. Property values of the cured polymeric materials can be determined, for example, by using the following methods:

- stress relaxation properties can be assessed using an RSA-G2 instrument from TA Instruments, with a 3-point bending, according to ASTM D790; for example, stress relaxation can be measured at 30° C. and submerged in water, and reported as the remaining load after 24 hours, as either the percent (%) of initial load, and/or in MPa;
- storage modulus can be measured at 37° C. and is reported in MPa;
- $T_g$ of the cured polymeric material can be assessed using dynamic mechanical analysis (DMA) and is provided herein as the tan 6 peak;
- tensile modulus, tensile strength, elongation at yield and elongation at break can be assessed according to ISO 527-2 5B; and tensile strength at yield, elongation at break, tensile strength, and Young's modulus can be assessed according to ASTM D1708.

EXAMPLES

The following examples are given for the purpose of illustrating various aspects of the disclosure and are not meant to limit the present disclosure in any fashion. The present examples, along with the methods described herein are presently representative of some aspects, are exemplary, and are not intended as limitations on the scope of the disclosure. Changes therein and other uses which are encompassed within the spirit of the disclosure as defined by the scope of the claims will occur to those skilled in the art.

Example 1

Printing and Characterization of Fiber-Reinforced Polymeric Materials

This example covers effects of fiber reinforcements on the mechanical properties of polymeric materials. Two curable resins were loaded with 60-65 weight percent (wt %) of either 5 or 25 mm length, 15.3 μm diameter bioactive fibers comprised of 5.9 wt % $Na_2O$, 12 wt % $K_2O$, 5.3 wt % MgO, 22.6 wt % CaO, 50 wt % $SiO_2$, 4 wt % $P_2O_5$, and 0.2 wt % $B_2O_3$, and then cured to generate polymeric materials for analysis. Further control polymeric materials were generated from each curable resin without fiber additives. The composition and physical parameters of each curable resin are summarized in [TABLE 1].

TABLE 1

| | Resin '334:80' | Resin 'ju' |
|---|---|---|
| Matrix | 1:1:1 ratio of Urethane Dimethacrylate (UMDA), Bisphenol A-Glycidyl Methacrylate (bis-GMA), Dodecanediol Dimethacrylate (D3MA) | Adipic acid divinyl ester (AVE) |
| Flex Strength [MPa] | 400 | 175 |
| E-Modulus [GPa] | — | 15.5 |
| Strain [%] | 2.9 | 2.2 |

Resin 334; 80 contains 30 wt % toughness modifier, 30 wt % Tg modifier and 40 wt % reactive diluent, and Resin ju contains 40 wt % Miramer UA 5216 and 60 wt % Bomar XR741MS. The stress relaxation test specimen had a height of 1 mm, a width of 5 mm and a length between supports was 15 mm, and the applied strain was 2%.

Figure 4A:
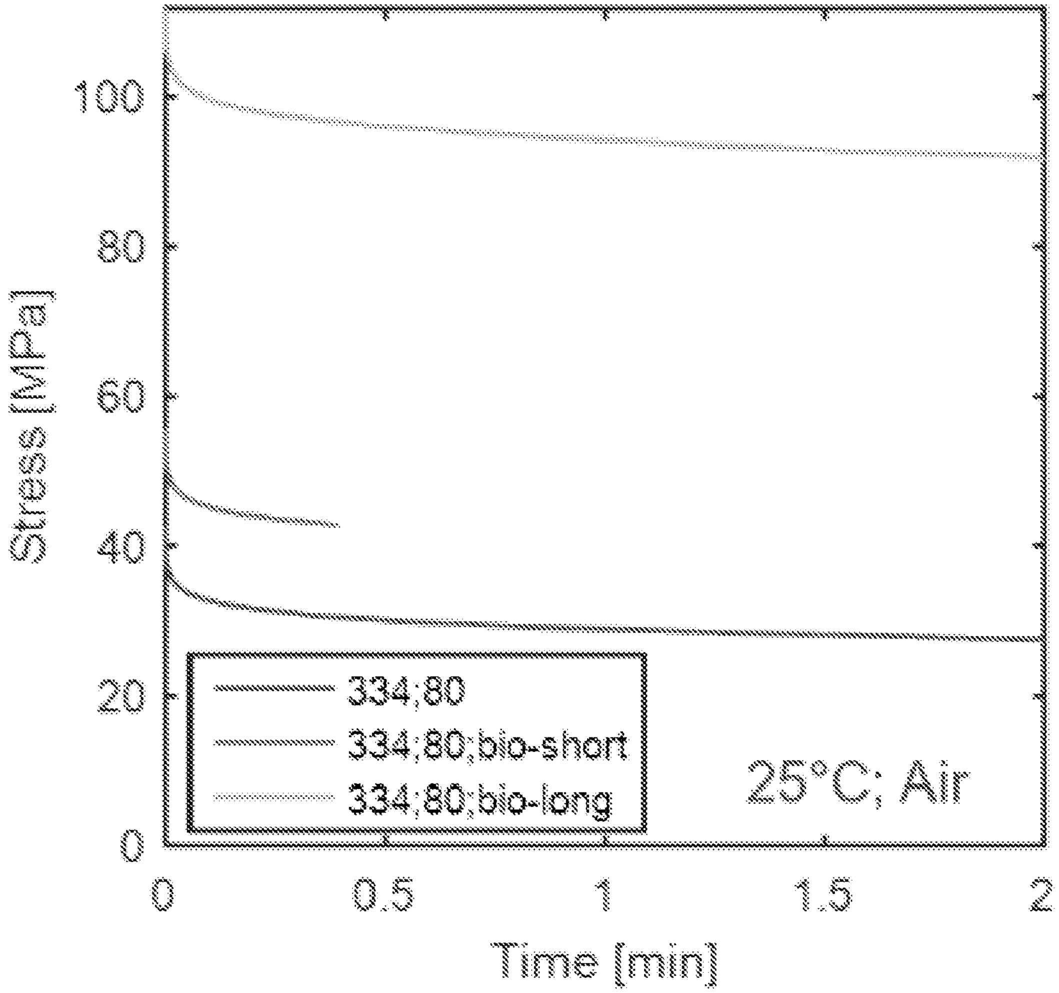
FIG. 4A provides stress-relaxation results for fiber-containing and fiber-free polymeric materials.
Figure 4B:
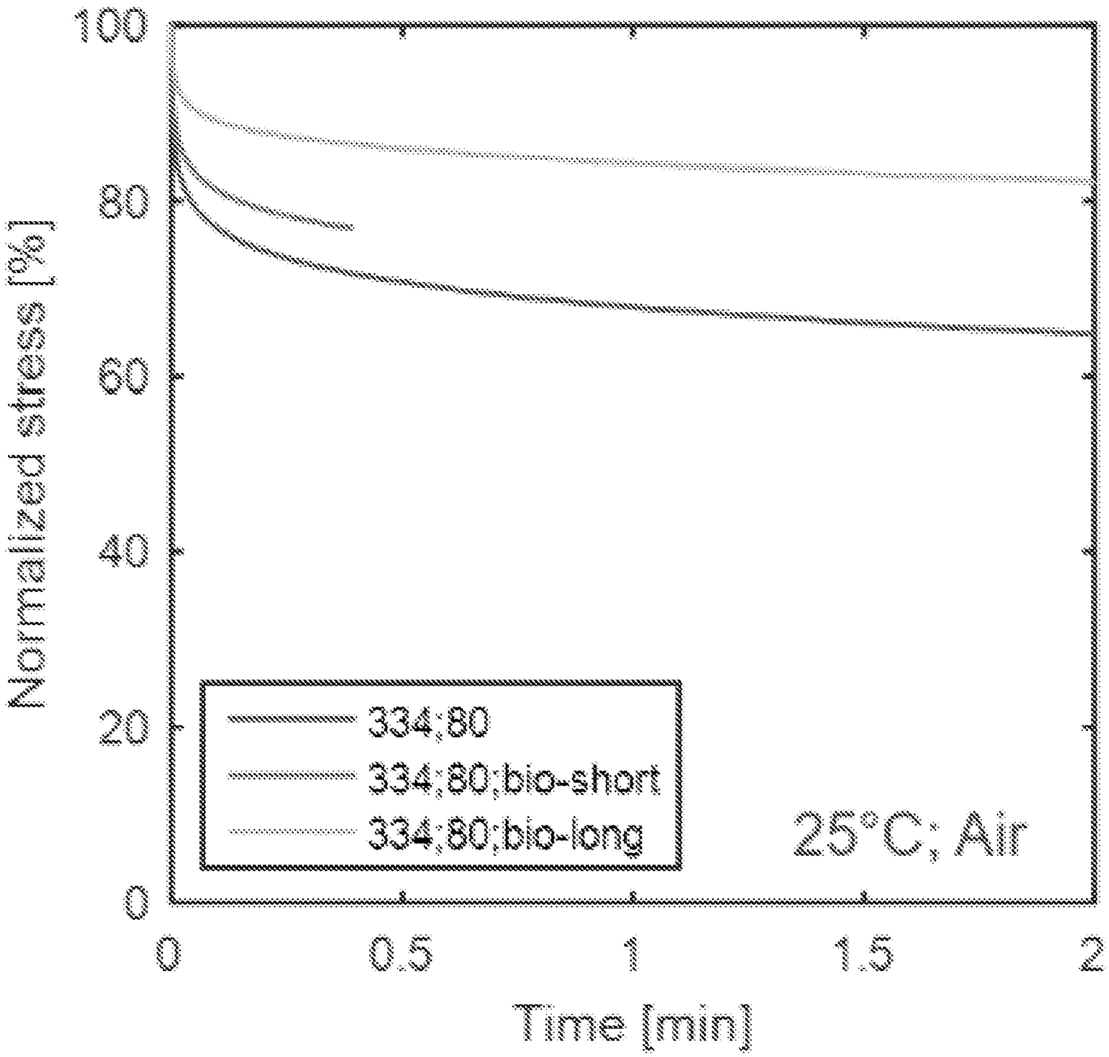
FIG. 4B provides normalized stress-relaxation profiles of those shown in FIG. 4A.

FIGS. 4A-B provide stress relaxation results of polymeric materials formed from resin 334:80 reinforced with 5 mm long bioactive fibers ('334:80; bio-short'), resin 334:80 reinforced with 25 mm long bioactive fibers ('334:80; bio-long'), and without bioactive fibers ('334:80').

FIG. 4A provides absolute stress values (y-axis, MPa) as a function of time (x-axis, minutes). As can be seen from the plot, the polymeric materials made with bioactive fibers exhibited higher flexural strength than the bioactive fiber-free polymeric material. The polymeric material with long (25 mm) bioactive fibers had about twice the flexural strength of the polymeric material with short (5 mm) bioactive fibers, and nearly three times the flexural strength of the polymeric material containing no bioactive fibers.

FIG. 4B provides normalized stress values (y-axis, % of maximum measured stress) as a function of time (x-axis, minutes). The polymeric materials with bioactive fibers displayed the greatest flexural strength retention, with the long bioactive fiber-containing material exhibiting nearly twice the flexural strength retention of the short bioactive fiber-containing material.

Figure 5A:
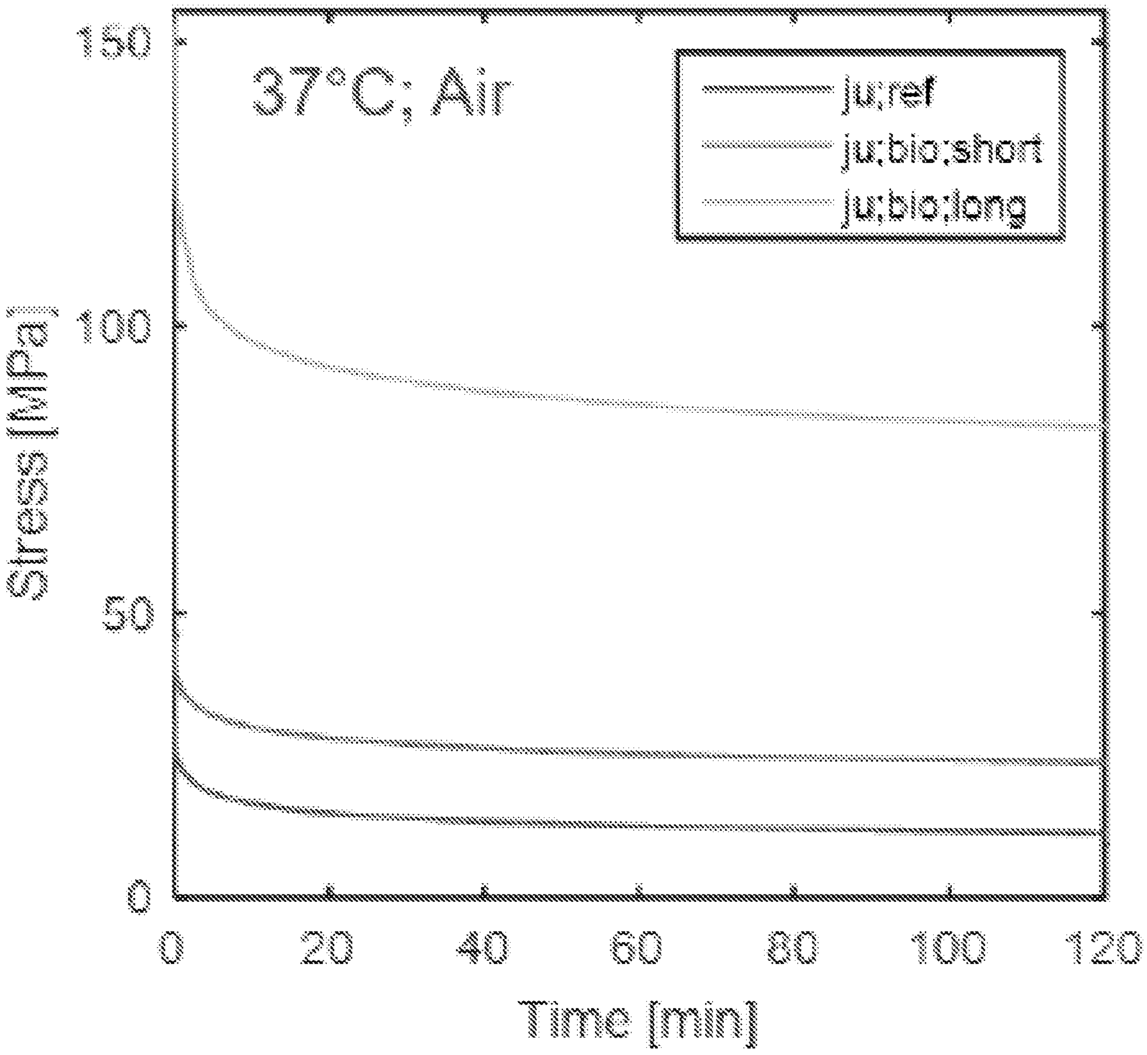
FIG. 5A provides stress-relaxation results for fiber-containing and fiber-free polymeric materials.
Figure 5B:
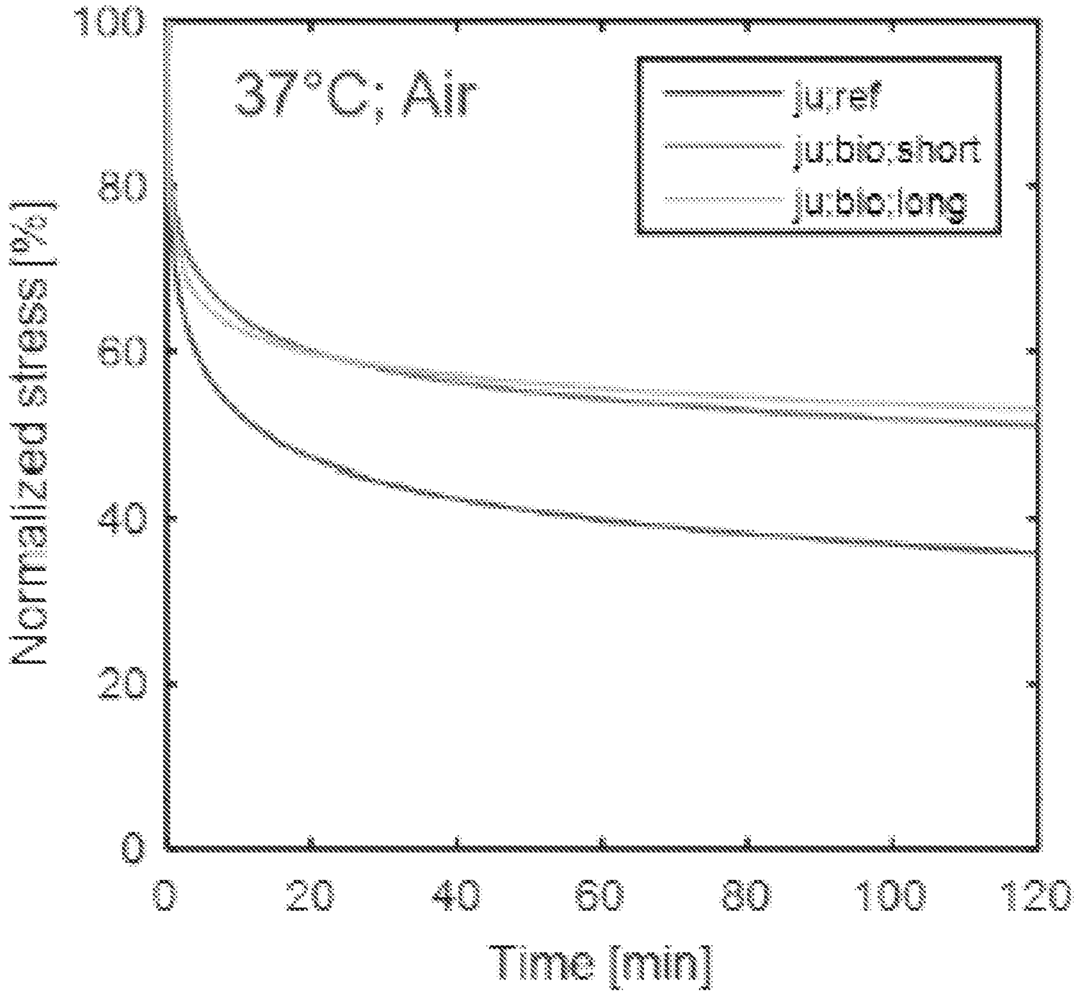
FIG. 5B provides normalized stress-relaxation profiles of those shown in FIG. 5A.

FIGS. 5A-B provide stress relaxation results of polymeric materials formed from resin ju reinforced with 5 mm long bioactive fibers ('ju;bio-short'), resin 334:80 reinforced with 25 mm long bioactive fibers ('ju;bio-long'), and without bioactive fibers ('ju;ref').

FIG. 5A provides absolute stress values (y-axis, MPa) as a function of time (x-axis, minutes) for the cured ju resins. As with the cured 334:80 resins, the ju resin containing long (25 mm) bioactive fibers exhibited the highest flexural strength, displaying a maximum stress more than three times greater than that of the short bioactive fiber-containing material, and about 5 times greater than that of the fiber-free material.

FIG. 5B provides normalized stress values (y-axis, % of maximum measured stress) as a function of time (x-axis, minutes) for the cured ju resins. The short and long bioactive fiber-containing materials exhibited similar normalized stress curves, indicating that stress relaxation is likely independent of fiber length for reinforced ju materials. Both bioactive fiber-containing materials exhibited lower stress relaxation than the fiber-free material, demonstrating the ability of the bioactive fibers to aid in strength-retention.

Figure 6:
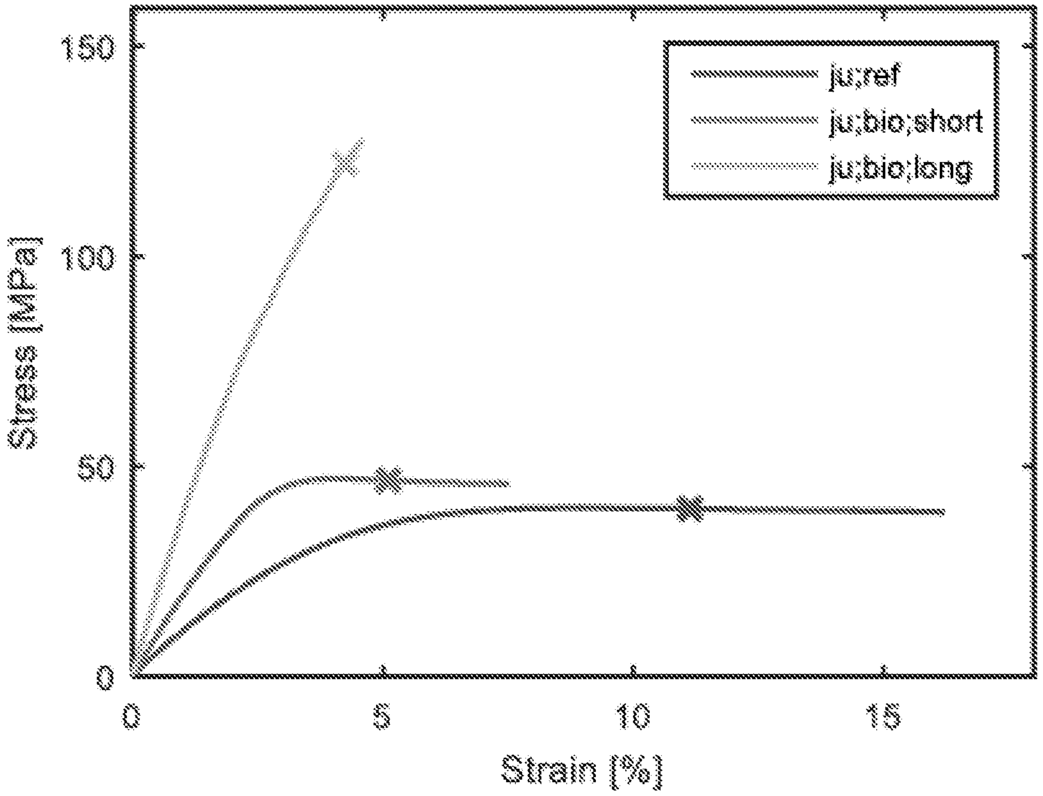
FIG. 6 provides stress-strain curves for fiber-containing and fiber-free polymeric materials.

FIG. 6 provides stress-strain curves of the polymeric materials formed from resin ju reinforced with 5 mm long bioactive fibers ('ju;bio-short'), resin 334:80 reinforced with 25 mm long bioactive fibers ('ju;bio-long'), and without bioactive fibers ('ju;ref'). The long bioactive fiber reinforced material exhibited the largest elastic regime and highest yield-strength of the three materials. The short bioactive fiber reinforced material exhibited a shorter elastic regime and higher yield strength than the fiber-free material. Both bioactive fiber-containing materials fractured at higher stress and with lower strain than the fiber-free material.

Example 2

Treatment Using an Orthodontic Appliance

This example describes the use of a directly 3D printed orthodontic appliance to move a patient's teeth according to a treatment plan. This example also describes the characteristics that the orthodontic appliance can have following its use, in contrast to its characteristics prior to use.

A patient in need of, or desirous of, a therapeutic treatment to rearrange at least one tooth has their teeth arrangement assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using photo-curable resins and methods disclosed further herein, to provide orthodontic appliances having low levels of hydrogen bonding units. In some aspects, a plurality of orthodontic appliances is used, each of which can be fabricated using the photo-curable resins comprising one or more polymerizable compounds and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), remaining flexural stress, relative flexural modulus, and relative elongation at break can be determined.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the present disclosure has been specifically disclosed by some aspects, exemplary aspects and optional features, modification and variation of the concepts herein disclosed may be resorted to by those skilled in the art, and that such modifications and variations are considered to be within the scope of this disclosure as defined by the appended claims. The specific aspects provided herein are examples of useful aspects of the present disclosure and it will be apparent to one skilled in the art that the present disclosure may be carried out using a large number of variations of the devices, device components, methods steps set forth in the present description. As will be obvious to one of skill in the art, methods and devices useful for the present methods can include a large number of optional composition and processing elements and steps.

What is claimed is:

1. A method of manufacturing a finished product for a medical device, the method comprising:

providing a curable resin comprising a solid material dispersed therethrough, wherein the cured resin has a first solubility, and the solid material has a second solubility, wherein the second solubility is at least 102 times greater than the first solubility in water at 25° C. and a pH of 7;

curing a portion of the curable resin, thereby forming a cured resin; and separating an uncured portion of the curable resin from the cured resin, thereby producing the medical device comprising the cured resin; and treating the cured resin with a solvent to remove a portion of the solid material exposed from a surface of the cured resin while retaining another portion of the solid material embedded within the cured resin.

2. The method of claim 1, wherein the solid material is bioglass or bioglass fiber.

3. The method of claim 2, wherein the medical device comprises a dental aligner, an expander or a spacer.

4. The method of claim 1, wherein the solid material comprises a metal, a metal oxide, a metal sulfide, a ceramic, a salt, silica, a carbon allotrope, or a combination thereof.

5. The method of claim 1, wherein the solvent comprises an aqueous solvent.

6. The method of claim 1, wherein the solvent is supercritical $CO_2$.

7. The method of claim 1, wherein the first solubility is $10^{-2}$ g/L in water at 25° C. and a pH of 7, and the second solubility is in a range of 5 mg/L and 5000 mg/L in water at 25° C. and a pH of 7.

8. The method of claim 2, wherein the bioglass comprises at least one, at least two, at least three, or all four of $Na_2O$, $CaO$, $SiO_2$, and $P_2O_5$.

9. A method of manufacturing a surface modified device, the method comprising:

providing a curable resin comprising a reinforcement material dispersed therethrough;

curing a portion of the curable resin, thereby forming a cured resin with a first portion of the reinforcement material embedded within the cured resin and a second portion of the reinforcement material exposed from a surface of the cured resin;

separating an uncured portion of the curable resin from the cured resin; and removing at least a portion of the second portion of the reinforcement material, thereby forming the surface modified device, wherein the removing comprises dissolving the at least a portion of the second portion of the reinforcement material.

10. The method of claim 9, wherein the reinforcement material comprises bioglass or bioglass fiber.

11. The method of claim 9, wherein the curing comprises photopolymerization.

12. The method of claim 9, wherein the separating comprises removing the cured resin from a vat comprising the curable resin.

13. The method of claim 9, wherein the dissolving comprises use of an organic solvent and salt water.

14. The method of claim 9, wherein the first portion of the reinforcement material is retained within the cured resin during the removing at least a portion of the second portion of the reinforcement material.

15. The method of claim 9, wherein during the removing at least 80% of the second portion of the reinforcement material is removed in less than 5 minutes.

16. The method of claim 9, wherein the curable resin comprises an acrylate or a methacrylate.

17. The method of claim 9, wherein the reinforcement material is bioactive.

18. The method of claim 9, wherein, during the curing the curable resin shrinks at least 5% less than the curable resin lacking the reinforcement material.

19. The method of claim 9, wherein the reinforcement material is homogeneously or randomly dispersed throughout the curable resin.

20. The method of claim 19, wherein the reinforcement material is homogeneously dispersed prior to or concurrent with the curing of the portion of the curable resin.

* * * * *